(12) United States Patent
Kashihara et al.

(10) Patent No.: US 6,501,882 B2
(45) Date of Patent: Dec. 31, 2002

(54) ARRAYED WAVEGUIDE GRATING TYPE OPTICAL MULTIPLEXER/DEMULTIPLEXER

(75) Inventors: Kazuhisa Kashihara, Tokyo (JP); Kazutaka Nara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/026,722

(22) Filed: Dec. 27, 2001

(65) Prior Publication Data

US 2002/0122627 A1 Sep. 5, 2002

(30) Foreign Application Priority Data

Dec. 28, 2000 (JP) ........................................ 2000-400362

(51) Int. Cl.[7] .............................. G02B 6/34; G02B 6/26; G02B 6/28; H04J 14/02
(52) U.S. Cl. ...................................................... 385/37
(58) Field of Search ........................... 385/31–43, 24, 385/16, 147, 28, 129–132, 133, 139, 130; 359/124, 125, 161, 179, 109, 115, 341, 130, 127

(56) References Cited

U.S. PATENT DOCUMENTS

| | | | | |
|---|---|---|---|---|
| 5,467,415 A | * | 11/1995 | Presby ........................ 385/129 |
| 6,118,561 A | * | 9/2000 | Maki ........................... 359/124 |
| 6,212,315 B1 | * | 4/2001 | Doerr .......................... 385/31 |
| 6,281,997 B1 | * | 8/2001 | Alexander et al. ........... 359/124 |
| 6,351,581 B1 | * | 2/2002 | Doerr et al. ................. 359/124 |
| 6,404,948 B2 | * | 6/2002 | Alexander et al. ........... 359/115 |
| 6,421,478 B1 | * | 7/2002 | Paiam ......................... 385/24 |

OTHER PUBLICATIONS

U.S. patent application Ser. No. 10/126,722, filed Dec. 27, 2001, pending.

U.S. patent application Ser. No. 10/058,085, filed Jan. 29, 2002, pending.

* cited by examiner

Primary Examiner—Akm E. Ullah
(74) Attorney, Agent, or Firm—Oblon, Spivak, McClelland, Maier & Neustadt, PC

(57) ABSTRACT

An arrayed waveguide grating optical multiplexer/demultiplexer includes an arrayed waveguide connected to at least one first optical waveguide via a first slab waveguide, a plurality of second optical waveguides connected to the arrayed waveguide via a second slab waveguide. At least one expanding width waveguide has a first end portion and a second end portion having a second width larger than a first width of the first end portion. Each first end portion is connected to each first optical waveguide. The second end portion is connected to the first slab waveguide. The first width of the first end portion is larger than a first optical waveguide width of the at least one first optical waveguide. The first width of the first end portion satisfies a single mode condition. A width of the expanding width waveguide increases from the first end portion toward the second end portion.

29 Claims, 22 Drawing Sheets

ARRAYED WAVEGUIDE GRATING TYPE OPTICAL MULTIPLEXER/DEMULTIPLEXER

CROSS-REFERENCES TO RELATED APPLICATIONS

The present application claims priority under 35 U.S.C. §119 to Japanese Patent Application No. 2000-400362, filed Dec. 28, 2000, entitled "Arrayed Waveguide Grating Optical Multiplexer/Demultiplexer and Optical Waveguide Circuit." The contents of this application are incorporated herein by reference in their entirety.

BACKGROUND OF THE INVENTION

1. Field of the Invention

The present invention relates to an arrayed waveguide grating optical multiplexer/demultiplexer and an expanding width waveguide.

2. Discussion of the Background

In recent optical communications, research and development of optical wavelength division multiplexing communications has actively been made as a way to exponentially increase the transmission volume, and the results are being put into practice. The optical wavelength division multiplexing communications uses, for example, a technique of wavelength division multiplexing on a plurality of light beams each having a wavelength different from one another to transmit them. In the system of such optical wavelength division multiplexing communications, an optical multiplexer/demultiplexer is necessary which multiplexes a plurality of light beams each having a wavelength different from one another and which demultiplexes light that has undergone wavelength division multiplexing to be transmitted to create a plurality of light beams each having a wavelength different from one another.

FIG. 18(a) illustrates an arrayed waveguide grating (AWG) type optical multiplexer/demultiplexer. Referring to FIG. 18(a), the arrayed waveguide grating type optical multiplexer/demultiplexer is obtained by forming on a substrate 11 an optical waveguide unit 10 that has a waveguide structure.

The waveguide structure includes at least one optical input waveguide 12 arranged side by side, a first slab waveguide 13 connected to the exit ends of the optical input waveguides 12, an arrayed waveguide 14 connected to the exit end of the first slab waveguide 13, a second slab waveguide 15 connected to the exit end of the arrayed waveguide 14, and a plurality of optical output waveguides 16 that are arranged side by side and connected to the exit end of the second slab waveguide 15.

The arrayed waveguide 14 propagates light that is outputted from the first slab waveguide 13, and is composed of a plurality of channel waveguides (14a) that are arranged side by side. Lengths of adjacent channel waveguides (14a) are different from each other by a predetermined length difference (ΔL). The optical input waveguides 12 and the optical output waveguides 16 have the same dimension.

The number of optical output waveguides 16 is determined, for example, in accordance with the number of light beams which have different wavelengths and which are created by demultiplexing signal light with the arrayed waveguide grating type optical multiplexer/demultiplexer. The arrayed waveguide 14 usually includes a large number (for example, 100) of the channel waveguides (14a). However, FIG. 18(a) is simplified and the number of the channel waveguides (14a), the optical output waveguides 16, and the optical input waveguides 12 in FIG. 18(a) does not exactly reflect the actual number thereof.

FIG. 18(b) schematically shows an enlarged view of an area of FIG. 18(a) which is surrounded by a dotted line (A). As shown in FIG. 18(b), in the arrayed waveguide grating type optical multiplexer/demultiplexer in the background art, the substantially straight portion (12a) which is connected to an end portion of the slightly curved portion (12b) of the optical input waveguides 12 is directly connected to the entrance end of the first slab waveguide 13. Similarly, the substantially straight portion which is connected to an end portion of the slightly curved portion of the optical output waveguides 16 is directly connected to the exit end of the second slab waveguide 15.

One of the optical input waveguides 12 is connected to, for example, transmission side optical fiber, so that light having undergone the wavelength division multiplexing is introduced to one of the optical input waveguides 12. The light which has traveled through one of the optical input waveguides 12 and been introduced to the first slab waveguide 13 is diffracted by the diffraction effect thereof and enters the arrayed waveguide 14 to travel along the arrayed waveguide 14.

Having traveled through the arrayed waveguide 14, the light reaches the second slab waveguide 15 and then is condensed in the optical output waveguides 16 to be outputted therefrom. Because of the preset difference in length between adjacent channel waveguides (14a) of the arrayed waveguide 14, light beams after traveling through the arrayed waveguide 14 have phases different from one another. The wavefront of the light beam is tilted in accordance with this difference and each position where each light beam is condensed is determined by the angle of this tilt. Therefore, the light beams having different wavelengths are condensed at positions different from one another. By forming the optical output waveguides 16 at these positions, the light beams having different wavelengths can be outputted from their respective optical output waveguides 16 that are provided for the respective wavelengths.

For instance, as shown in FIG. 18(a), the light having undergone the wavelength division multiplexing and having wavelengths of $\lambda 1, \lambda 2, \lambda 3, \ldots, \lambda n$ (n is an integer equal to or larger than 2), is inputted from one of the optical input waveguides 12. The light is diffracted in the first slab waveguide 13, reach the arrayed waveguide 14, and travel through the arrayed waveguide 14 and the second slab waveguide 15. Then, as described above, the light beams are respectively condensed at different positions determined by their wavelengths, enter different optical output waveguides 16, travel along their respective optical output waveguides 16, and are outputted from the exit ends of the respective optical output waveguides 16. The light beams having different wavelengths are taken out through optical fibers that are connected to the exit ends of the optical output waveguides 16.

In this arrayed waveguide grating type optical multiplexer/demultiplexer, improvement in wavelength resolution is in proportion to the difference in length (ΔL) between the channel waveguides (14a) of the arrayed waveguide 14. When the optical multiplexer/demultiplexer is designed to have a large (ΔL), it is possible to multiplex/demultiplex light to accomplish wavelength division multiplexing with small wavelength differences, which has not been attained by any conventional optical multiplexer/demultiplexer. It is thus possible for the optical multiplexer/demultiplexer to have a function of multiplexing/ demultiplexing a plurality of signal light beams, specifically a function of demultiplexing or multiplexing a plurality of optical signals with a wavelength difference of at most 1 nm. High density optical wavelength division multiplexing communications require such a small wavelength difference.

The arrayed waveguide grating type optical multiplexer/demultiplexer is obtained by, for example, forming a waveguide formation region 10 having the above waveguide structure on a substrate 11 made of silicon (Si) as follows:

That is, an under cladding layer (SiO2 based glass) and a core layer (for example, glass mainly containing SiO2 to which GeO2 is added) are formed on the substrate 11 by flame hydrolysis deposition method, and the above waveguide structure is formed by, for example, photolithography and reactive ion etching method. Subsequently, the over cladding layer that covers the waveguide structure of the core is formed by flame hydrolysis deposition method.

Japanese Unexamined Patent Publication (Kokai) No. Hei 5-313029 discloses an arrayed waveguide grating type multiplexer/demultiplexer. The contents of this reference are incorporated herein by reference in their entirety. In this multiplexer/demultiplexer, optical input waveguides are connected to an inputside slab waveguide via a tapered waveguide.

Japanese Unexamined Patent Publication (Kokai) No. Hei 8-122557 discloses an arrayed waveguide grating type multiplexer/demultiplexer. The contents of this reference are incorporated herein by reference in their entirety. In this multiplexer/demultiplexer, an optical input waveguide is connected to an inputside slab waveguide via a tapered waveguide which has a slit along a center axis of the tapered waveguide.

Japanese Unexamined Patent Publication (Kokai) No. Hei 9-297228 discloses an arrayed waveguide grating. The contents of this reference are incorporated herein by reference in their entirety. In this arrayed waveguide grating, optical input waveguides are connected to an inputside slab waveguide via a parabolic waveguide.

SUMMARY OF THE INVENTION

According to an aspect of the present invention, an arrayed waveguide grating optical multiplexer/demultiplexer includes at least one first optical waveguide, a first slab waveguide, an arrayed waveguide, a second slab waveguide, a plurality of second optical waveguides, and at least one expanding width waveguide. The arrayed waveguide is connected to the at least one first optical waveguide via the first slab waveguide. The arrayed waveguide includes a plurality of channel waveguides each of which has a different length. The plurality of second optical waveguides are connected to the arrayed waveguide via the second slab waveguide. The at least one expanding width waveguide has a first end portion and a second end portion having a second width larger than a first width of the first end portion. The first end portion of each of the at least one expanding width waveguide is connected to each of the at least one first optical waveguide. The second end portion is connected to the first slab waveguide. The first width of the first end portion is larger than a first optical waveguide width of the at least one first optical waveguide. The first width of the first end portion satisfies a single mode condition. A width of the at least one expanding width waveguide increases from the first end portion toward the second end portion.

According to another aspect of the present invention, an arrayed waveguide grating optical multiplexer/demultiplexer includes at least one first optical waveguide, a first slab waveguide, an arrayed waveguide, a second slab waveguide, a plurality of second optical waveguides, and a plurality of expanding width waveguides. The arrayed waveguide is connected to the at least one first optical waveguide via the first slab waveguide. The arrayed waveguide includes a plurality of channel waveguides each of which has a different length. The plurality of second optical waveguides are connected to the arrayed waveguide via the second slab waveguide. Each of the plurality of expanding width waveguides has a third end portion and a fourth end portion having a fourth width larger than a third width of the third end portion. The third end portion of each of the plurality of expanding width waveguides is connected to each of the plurality of second optical waveguides. The fourth end portion is connected to the second slab waveguide. The third width of the third end portion is larger than a second optical waveguide width of each of the plurality of second optical waveguides. The third width of the third end portion satisfies a single mode condition. A width of the expanding width waveguide increases from the third end portion toward the fourth end portion.

According to yet another aspect of the present invention, an arrayed waveguide grating optical multiplexer/demultiplexer includes at least one first optical waveguide, a first slab waveguide, an arrayed waveguide, a second slab waveguide, a plurality of second optical waveguides, at least one first expanding width waveguide and a plurality of second expanding width waveguides. The arrayed waveguide is connected to the at least one first optical waveguide via the first slab waveguide. The arrayed waveguide includes a plurality of channel waveguides each of which has a different length. The plurality of second optical waveguides are connected to the arrayed waveguide via the second slab waveguide. The at least one first expanding width waveguide has a first end portion and a second end portion. The second width of the second end portion is larger than a first width of the first end portion. The first end portion of each of the at least one first expanding width waveguide is connected to each of the at least one first optical waveguide. The second end portion is connected to the first slab waveguide. The first width of the first end portion is larger than a first optical waveguide width of the at least one first optical waveguide. The first width of the first end portion satisfies a single mode condition. A width of the at least one first expanding width waveguide increases from the first end portion toward the second end portion. Each of the plurality of second expanding width waveguides has a third end portion and a fourth end portion. A fourth width of the fourth end portion is larger than a third width of the third end portion. The third end portion of each of the plurality of second expanding width waveguides is connected to each of the plurality of second optical waveguides. The fourth end portion is connected to the second slab waveguide. The third width of the third end portion is larger than a second optical waveguide width of each of the plurality of second optical waveguides. The third width of the third end portion satisfies a single mode condition. A width of the second expanding width waveguide increases from the third end portion toward the fourth end portion.

According to further aspect of the present invention, an expanding width waveguide includes a first end portion and a second end portion having a second width larger than a first width of the first end portion. The first end portion is configured to be connected to at least one first optical waveguide. The second end portion is configured to be connected to the first slab waveguide. The first width of the first end portion is larger than a first optical waveguide width of the at least one first optical waveguide. The first width of the first end portion satisfies a single mode condition. A width of the expanding width waveguide increases from the first end portion toward the second end portion.

According to further aspect of the present invention, an optical waveguide circuit includes an expanding width waveguide. The expanding width waveguide includes a first end portion which has a first width and which is configured to be connected to a single mode waveguide. The first width is larger than a waveguide width of the single mode waveguide and satisfies a single mode condition. Further, the expanding width waveguide includes a second end portion which has a second width larger than the first width of the first end portion. A width of the expanding width waveguide increases from the first end portion toward the second end portion.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE EMBODIMENTS

Figure 1:
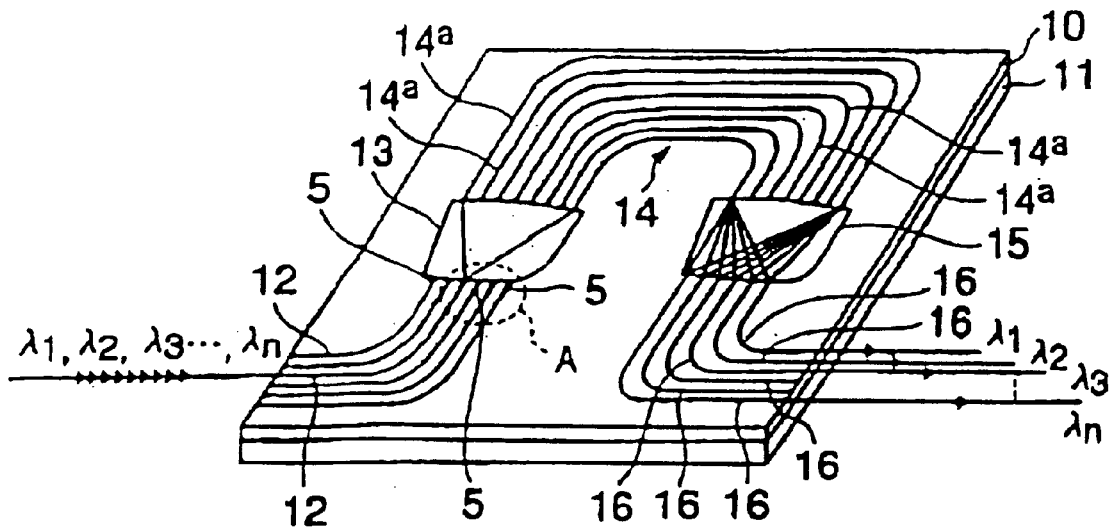
FIGS. 1(a) and 1(b) are structural diagrams schematically showing an arrayed waveguide grating optical multiplexer/demultiplexer according to a first embodiment of the present invention.
Figure 1:
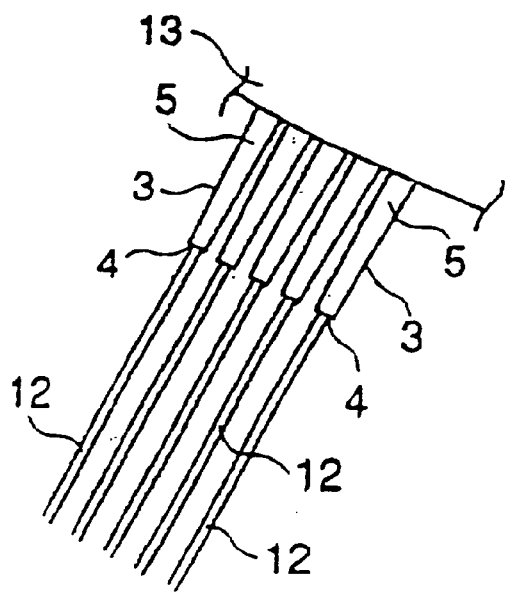

The embodiments will now be described with reference to the accompanying drawings, wherein like reference numerals designate corresponding or identical elements throughout the various drawings.

For example, the optical multiplexer/demultiplexer is required to have the following performances as examples. That is, first, in order to increase the transmission capacity of information, it is required to multiplex and demultiplex light signals within a predetermined setting wavelength difference whose wavelengths are different from each other as small as possible. For example, it is required that light signals in the 1.55 μm band whose wavelengths are different from each other by about 0.8 nm (100 GHz difference) may be multiplexed and demultiplexed.

Second, it is required that a loss is low at the respective wavelengths which are multiplexed or demultiplexed. For example, the wavelength division multiplexing transmission system requires that an element that multiplexes and demultiplexes a light having frequency intervals of 100 GHz in the 1.55 μm band have an optical loss (optical transmission loss) of at most 4 dB.

Third, it is required that the transmitting band at the respective wavelengths which are multiplexed and demultiplexed is broad. For example, the wavelength division multiplexing transmission system requires that an element that multiplexes and demultiplexes the light having frequency intervals of 100 GHz have the 1 dB band whose width is at least 0.2 nm (preferably at least 0.24 nm).

Fourth, it is required that both of crosstalk in the adjacent passing bands (hereinafter referred to as an "adjacent crosstalk") and the worst crosstalk in all passing bands further than the adjacent bands (hereinafter referred to as a "background crosstalk") are low, that is, the total crosstalk is low. The wavelength division multiplexing system requires that, for example, the adjacent crosstalk is at most −26 dB, the background crosstalk is at most −30 dB.

FIG. 1(a) schematically shows the structure and the operation of the main part of an arrayed waveguide grating type optical multiplexer/demultiplexer according to a first embodiment of the present invention. FIG. 1(b) is an enlarged view of an area surrounded by the dotted line (A) in FIG. 1(a). FIG. 2 further shows specifics of an end side of one of optical input waveguides 12 in the enlarged view of FIG. 1(b).

Referring to FIG. 1(a), the arrayed waveguide grating type optical multiplexer/demultiplexer is obtained by forming on a substrate 11 an optical waveguide unit 10 that has a waveguide structure.

The waveguide structure includes at least one optical input waveguide (a first optical waveguide) 12 arranged side by side, a first slab waveguide 13 connected to the exit ends of the optical input waveguides 12, an arrayed waveguide 14 connected to the exit end of the first slab waveguide 13, a second slab waveguide 15 connected to the exit end of the arrayed waveguide 14, and a plurality of optical output waveguides (second optical waveguides) 16 that are arranged side by side and connected to the exit end of the second slab waveguide 15. In the present embodiment, for example, light is input from one of the optical input waveguides 12.

The arrayed waveguide 14 propagates light that is outputted from the first slab waveguide 13. The arrayed waveguide 14 includes a plurality of channel waveguides (14a) that are arranged side by side. Lengths of adjacent channel waveguides (14a) are different from each other by a predetermined length difference (ΔL). The optical input waveguides 12 and the optical output waveguides 16 have the same dimension.

The number of optical output waveguides 16 is determined, for example, in accordance with the number of light beams which have different wavelengths and which are created by demultiplexing signal light with the arrayed waveguide grating type optical multiplexer/demultiplexer. The arrayed waveguide 14 usually includes a large number (for example, 100) of the channel waveguides (14a). However, FIG. 1(a) is simplified and the number of the channel waveguides (14a), the optical output waveguides 16, and the optical input waveguides 12 in FIG. 1(a) does not exactly reflect the actual number thereof.

One of the at least optical input waveguide 12 is connected to, for example, transmission side optical fiber, so that light having undergone the wavelength division multiplexing is introduced to one of the optical input waveguides 12. The light which has traveled through one of the optical input waveguides 12 and been introduced to the first slab waveguide 13 is diffracted by the diffraction effect thereof and enters the arrayed waveguide 14 to travel along the arrayed waveguide 14.

Having traveled through the arrayed waveguide 14, the light reaches the second slab waveguide 15 and then is condensed in the optical output waveguides 16 to be outputted therefrom. Because of the preset difference in length between adjacent channel waveguides (14a) of the arrayed waveguide 14, light beams after traveling through the arrayed waveguide 14 have phases different from one another. The wavefront of the light beams is tilted in accordance with this difference and each position where each light beam is condensed is determined by the angle of this tilt. Therefore, the light beams having different wavelengths are condensed at positions different from one another. By forming the optical output waveguides 16 at these positions, the light beams having different wavelengths can be outputted from their respective optical output waveguides 16 that are provided for the respective wavelengths.

For instance, as shown in FIG. 1(a), the light having undergone the wavelength division multiplexing and having wavelengths of λ1, λ2, λ3, . . . , λn (n is an integer equal to or larger than 2), is inputted from one of the optical input waveguides 12. The light is diffracted in the first slab waveguide 13, reach the arrayed waveguide 14, and travel through the arrayed waveguide 14 and the second slab waveguide 15. Then, as described above, the light beams are respectively condensed at different positions determined by their wavelengths, enter different optical output waveguides 16, travel along their respective optical output waveguides 16, and are outputted from the exit ends of the respective optical output waveguides 16. The light beams having different wavelengths are taken out through optical fibers that are connected to the exit ends of the optical output waveguides 16.

In this arrayed waveguide grating type optical multiplexer/demultiplexer, improvement in wavelength resolution is in proportion to the difference in length ($\Delta L$) among the channel waveguides (14a) of the arrayed waveguide 14. When the optical multiplexer/demultiplexer is designed to have a large ($\Delta L$), it is possible to multiplex/demultiplex light to accomplish wavelength division multiplexing with small wavelength differences, which has not been attained by any conventional optical multiplexer/demultiplexer. It is thus possible for the optical multiplexer/demultiplexer to have a function of multiplexing/demultiplexing a plurality of signal light beams, specifically a function of demultiplexing or multiplexing a plurality of optical signals with a wavelength difference of at most 1 nm. High density optical wavelength division multiplexing communications require such a small wavelength difference.

The arrayed waveguide grating type optical multiplexer/demultiplexer is obtained by, for example, forming a waveguide formation region 10 having the above waveguide structure on a substrate 11 made of silicon (Si).

That is, an under cladding layer (SiO2 based glass) and a core layer (for example, glass mainly containing SiO2 to which GeO2 is added) are formed on the substrate 11 by flame hydrolysis deposition method, and the above waveguide structure is formed by, for example, photolithography and reactive ion etching method. Subsequently, the over cladding layer that covers the waveguide structure of the core is formed by flame hydrolysis deposition method.

Figure 18A:
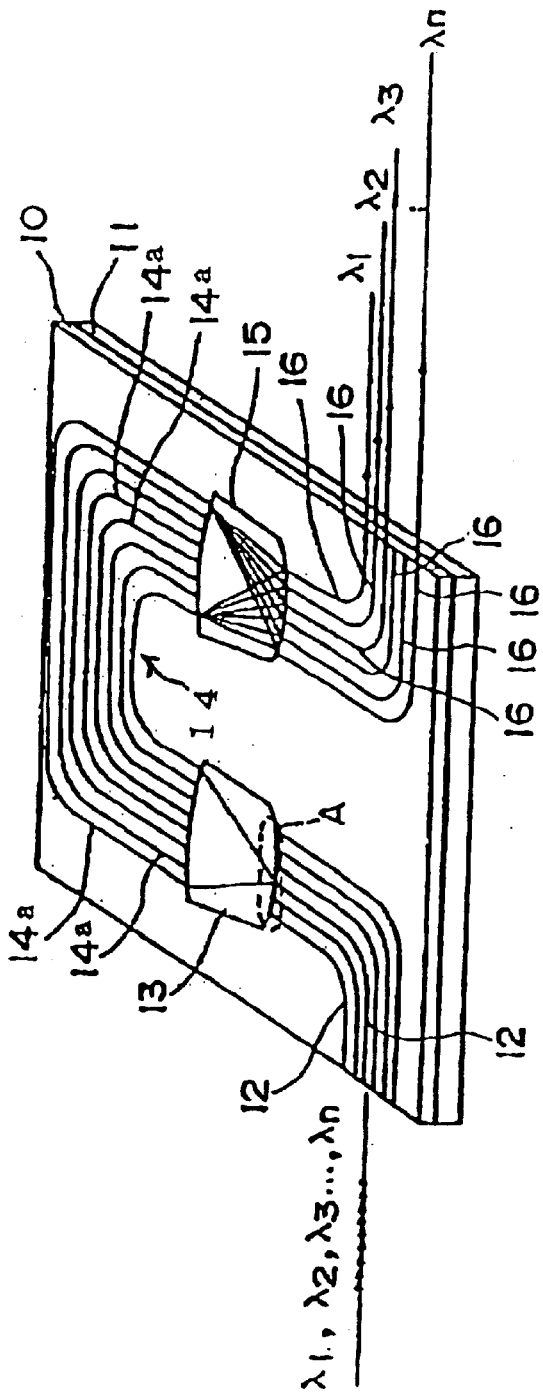
FIGS. 18(a) and 18(b) are schematic diagrams showing a structure of a conventional arrayed waveguide grating type optical multiplexer/demultiplexer.
Figure 18B:

In order to confirm whether the arrayed waveguide grating type optical multiplexer/demultiplexer according to the background art shown in FIGS. 18(a) and 18(b) has the performance required for the optical multiplexer/demultiplexer or not, the present inventors, according to FIGS. 18(a) and 18(b), made samples of the arrayed waveguide grating type optical multiplexer/demultiplexer with 16 channels which can multiplex and demultiplex a light about every 0.8 nm in the 1.55 $\mu$m band in the above manner and found the characteristics.

The arrayed waveguide grating type optical multiplexer/demultiplexer of this sample is formed such that the height of a core having the above waveguide structure is set to 6.5 $\mu$m, the widths of the optical input waveguide 12 and the optical output waveguides 16 are set to 6.5 $\mu$m, and the relative refractive index difference ($\Delta$) of the waveguide is set to 0.8%

As a result, the optical loss which is the second required performance required for the optical multiplexer/demultiplexer was excellent, that is, 2.0 dB, but the 1 dB band width which is the third required characteristic was 0.1 nm and is not satisfied.

Figure 19:
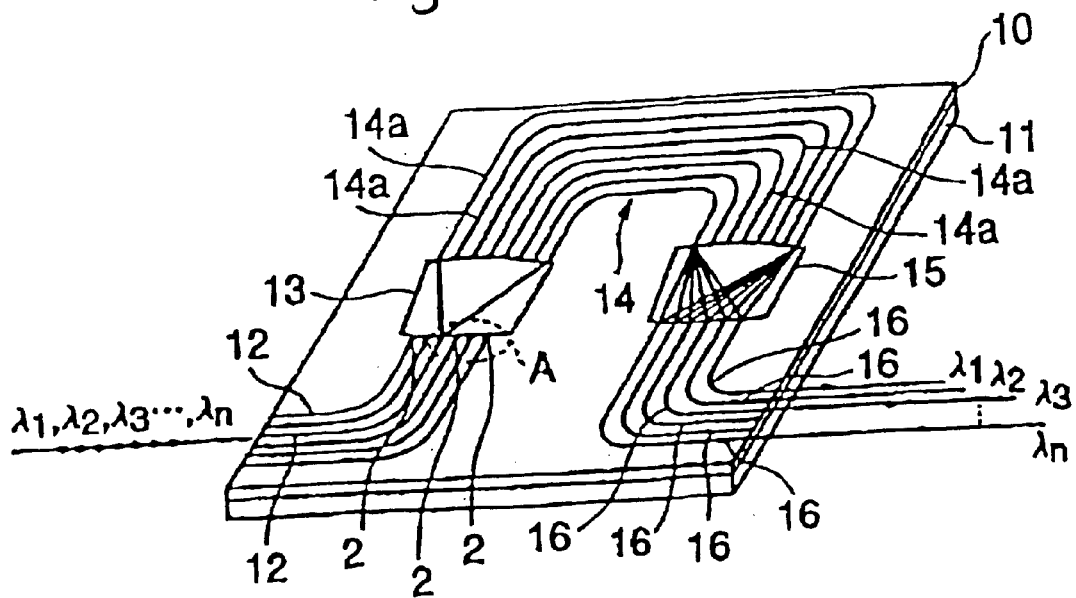
FIGS. 19(a) and 19(b) are explanatory diagrams for an arrayed waveguide grating type optical multiplexer/demultiplexer where a tapered waveguide is disposed at the output end of the optical input waveguide.
Figure 19:
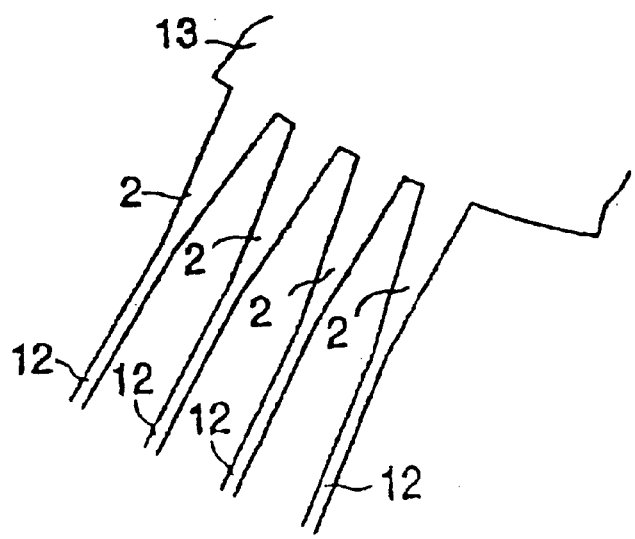

Under the above circumstances, a study was made to broaden the 1 dB band width as follows. First, referring to FIG. 20, a tapered waveguide 2 of a tapered structure disclosed in Japanese Unexamined Patent Publication No. Hei 5-313029 is disposed at the output end of the optical input waveguide 12 of the arrayed waveguide grating type optical multiplexer/demultiplexer as shown in FIGS. 19(a) and 19(b). Then, an arrayed waveguide grating type optical multiplexer/demultiplexer with 16 channels which can multiplex and demultiplex the lights with the wavelength differences of about 0.8 nm in the 1.55 $\mu$m band was formed, and its characteristics were obtained.

Figure 20:
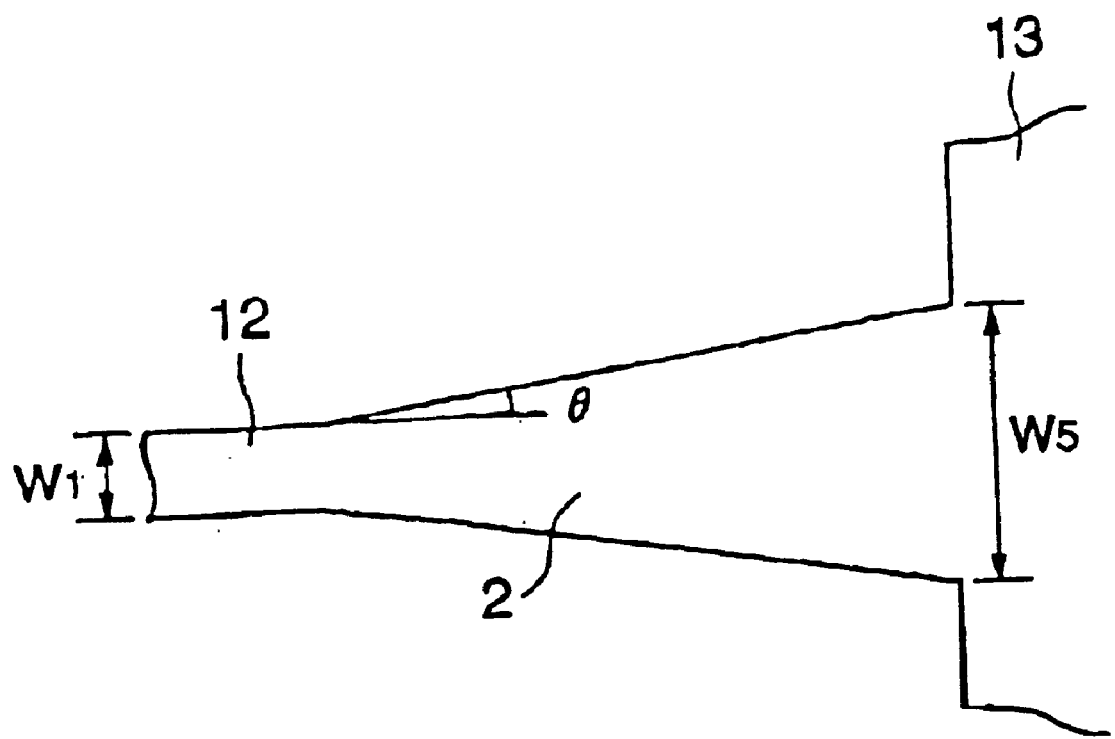
FIG. 20 is an explanatory diagram showing the structure of the output end side of an optical input waveguide according to an arrayed waveguide grating type optical multiplexer/demultiplexer shown in FIGS. 19(a) and 19(b)

In the arrayed waveguide grating type optical multiplexer/demultiplexer, the tapered waveguide width (W5) at the output end portion (an input end to the first slab waveguide 13) of the tapered waveguide 2 shown in FIG. 20 is set to 25 $\mu$m, and a tapered angle ($\theta$) is set to 0.23°.

As a result, the optical loss which is the second required characteristic of the optical multiplexer/demultiplexer is 3.8 dB, and the 1 dB band width of the third required characteristic is 0.3 nm, both of which are excellent. However, in the fourth required performance of the optical multiplexer/demultiplexer, the background crosstalk is −28 dB which cannot be satisfied although the adjacent crosstalk is −27 dB which is excellent.

In this study, the adjacent crosstalk is set to the value with respect to the difference between loss at the optical transmission center wavelength (hereinafter referred to as an "optical transmission center wavelength") and best loss in the adjacent wavelength range of ±(0.8±0.1) nm of the passing band, and the background crosstalk is set to the worst crosstalk in all the passing bands (passing band=passing wavelength±0.1 nm) further than the 1.5 nm in the optical transmission center wavelength.

Figure 21:
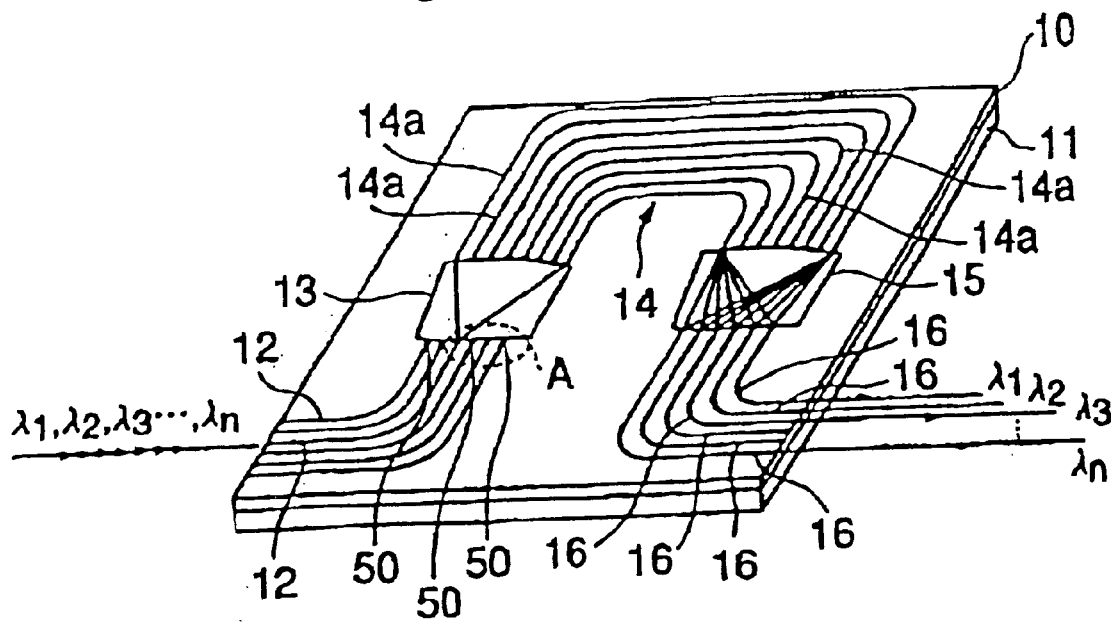
FIGS. 21(a) and 21(b) are explanatory diagrams for an arrayed waveguide grating type optical multiplexer/demultiplexer where a slit-shaped waveguide is disposed at the output end of the optical input waveguide.
Figure 21:
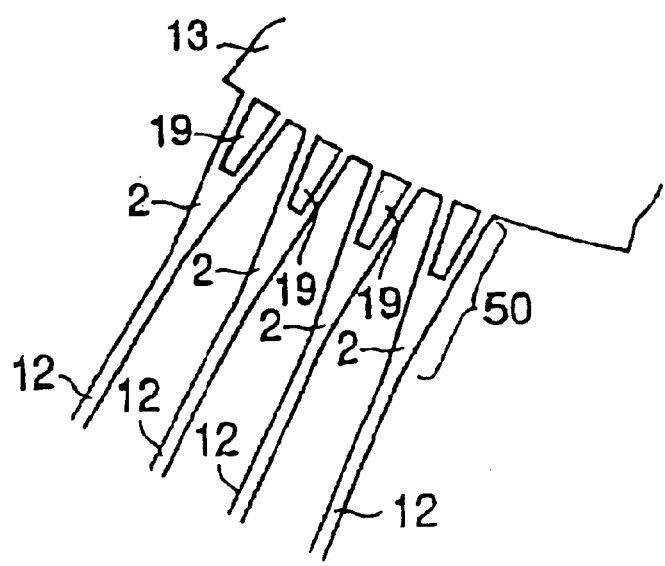
Figure 22:
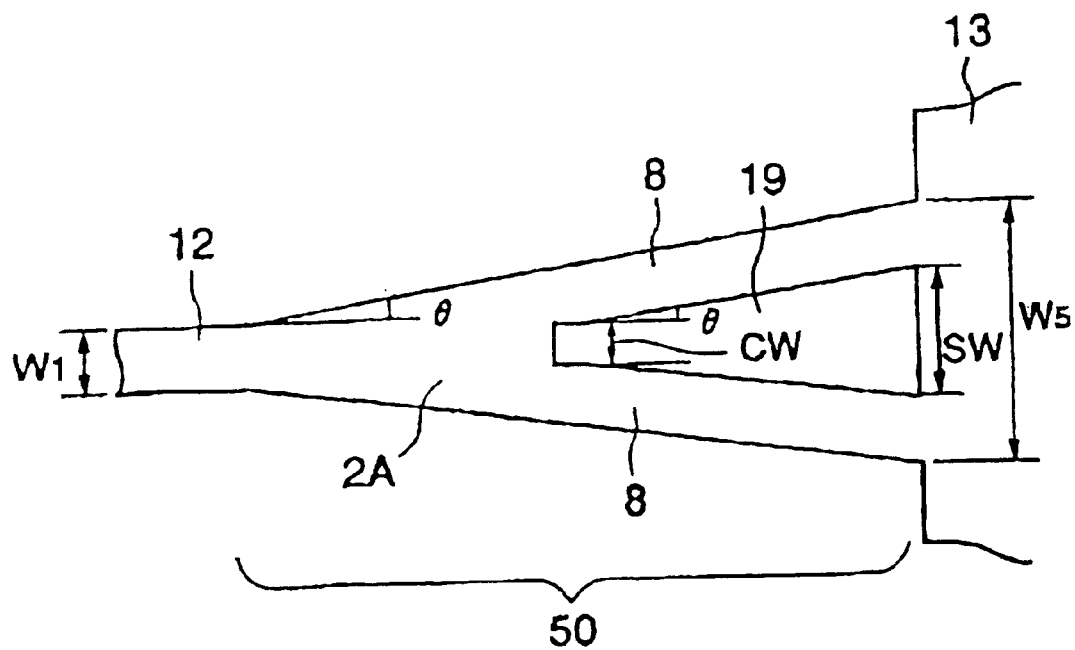
FIG. 22 is an explanatory diagram showing the structure of the output end side of an optical input waveguide according to an arrayed waveguide grating type optical multiplexer/demultiplexer shown in FIGS. 21(a) and 21(b)

Under the above circumstances, referring to FIG. 22, a slit-shaped waveguide 50 of a slit structure disclosed in Japanese Unexamined Patent Publication No. Hei 8-122557 is disposed at the output end of the optical input waveguide 12 of the arrayed waveguide grating type optical multiplexer/demultiplexer as shown in FIGS. 21(a) and 21(b). Then, an arrayed waveguide grating type optical multiplexer/demultiplexer with 16 channels which can multiplex and demultiplex the lights with the wavelength differences of about 0.8 nm in the 1.55 $\mu$m band was formed, and its characteristics were obtained.

The slit-shaped waveguide 50 has, as shown in FIG. 22, a tapered waveguide portion (2A) whose width gradually increases with a tapered angle ($\theta$). The tapered waveguide portion (2A) has at its center a trapezoidal slit 19, so that two narrow waveguide portions 8 are spaced apart. The distance between the narrow waveguide portions 8 is gradually increased toward a right direction in FIG. 22 (that is, toward the first slab waveguide 13). The upper base of the trapezoidal slit 19 has a width (CW) and the lower base of the trapezoidal slit 19 has a width (SW).

In this case, the waveguide width (W1) of the optical input waveguides 12 is set to 6.5 $\mu$m, the tapered angle ($\theta$) of the tapered waveguide portion (2A) is set to 0.40, the width (CW) of the upper base of the trapezoidal slit 19, namely, the width between the narrow width waveguides 8 at the output end of the tapered waveguide portion (2A) is set to 3.2 $\mu$m, the width (SW) of the lower base of the trapezoidal slit 19, namely, the width between the narrow width waveguides 8 at the input end of the first slab waveguide 13 is set to 5.0 $\mu$m, and a connection portion width (W5) with the fist slab waveguide 13 is set to 18 $\mu$m. Also, the heights of the respective waveguides are set to 6.5 $\mu$m, and the relative refractive index difference of the waveguide is set to 0.8%.

As a result, the 1 dB band width as an index of broadening the band of the third required characteristic to the optical multiplexer/demultiplexer is 0.30 nm which is excellent, but the optical loss which is the second required characteristic is 5 dB which is not satisfied. Also, the adjacent crosstalk which is the fourth required characteristic of the optical multiplexer/demultiplexer is −24 dB and the background crosstalk is −27 dB, both of which cannot be satisfied.

Figure 23:
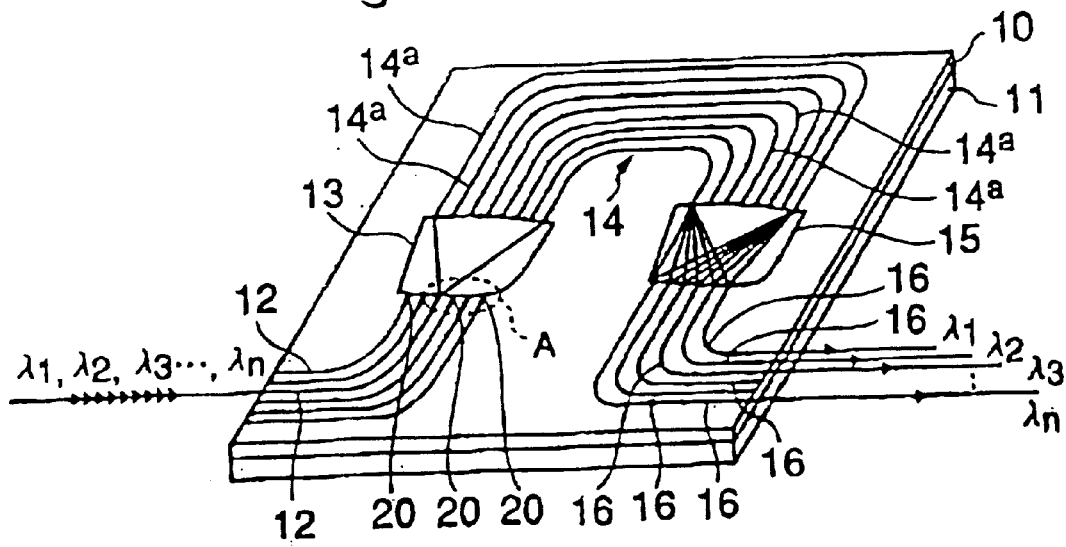
FIGS. 23(a) and 23(b) are explanatory diagrams for an arrayed waveguide grating type optical multiplexer/demultiplexer where a parabolic waveguide is disposed at the exit end of the optical input waveguide.
Figure 23:
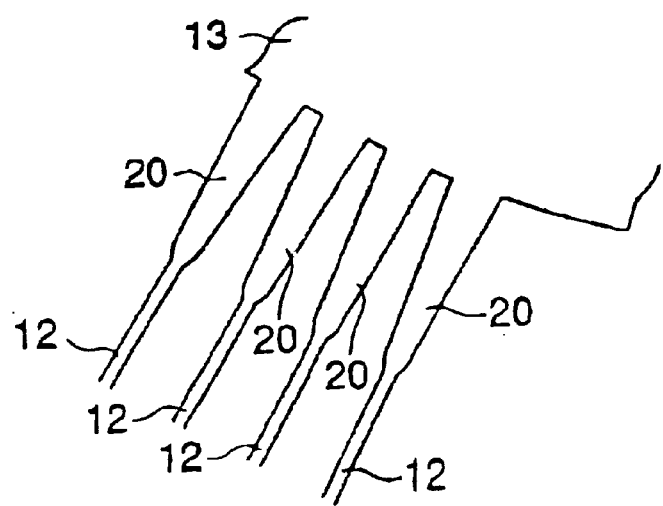
Figure 24:
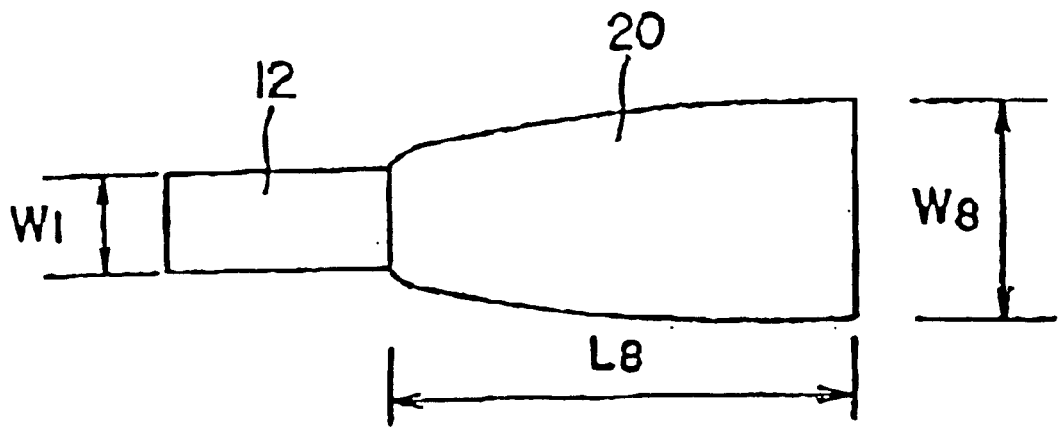
FIG. 24 is an explanatory diagram showing the structure of the output end side of an optical input waveguide according to an arrayed waveguide grating type optical multiplexer/demultiplexer shown in FIGS. 23(a) and 23(b)

Then, a parabolic waveguide 20 of a parabolic structure disclosed in Japanese Unexamined Patent Publication No. Hei 9-297228 as shown in FIG. 24 is disposed at the output end of the optical input waveguide 12 of the arrayed waveguide grating type optical multiplexer/demultiplexer as shown in FIGS. 23(a) and 23(b). Then, an arrayed waveguide grating type optical multiplexer/demultiplexer with 16 channels which can multiplex and demultiplex the lights with the wavelength differences of about 0.8 nm in the 1.55 μm band was formed, and its characteristics were obtained.

In the arrayed waveguide grating type optical multiplexer/demultiplexer, the width (W1) of the optical input waveguide 12 shown in FIG. 24 is set to 6.5 im, the parabolic tapered length (LB) is set to 420 μm, and the parabolic tapered wide end width (W8) is set to 19 μm. Also, the height of the waveguide is set to 6.5 μm, and the relative refractive index difference of the waveguides are set to 0.8%.

As a result, the optical loss which is the second required characteristic to the optical multiplexer/demultiplexer is 3.2 dB which is excellent, the 1 dB band width which is the third required characteristic is 0.22 nm which is excellent, and the background crosstalk which is one of the fourth required characteristics is −33 dB which is excellent, but the adjacent crosstalk is −24 dB which cannot be satisfied.

Also, in order to in more detail study the characteristics of the structure having the above parabolic waveguide 20, five samples of optical multiplexer/demultiplexers each having the same dimensions were made according to Japanese Unexamined Patent Publication No. Hei 9-297228, and their characteristics were reviewed. The result is shown in Table 1. It is found that the 1 dB band width and the adjacent crosstalk largely vary regardless of the same designed dimensions.

TABLE 1

|  | Optical loss (dB) | 1 dB band width (nm) | Adjacent crosstalk (dB) | Background crosstalk (dB) |
| --- | --- | --- | --- | --- |
| Sample 1 | 3.2 | 0.20 | −28 | −35 |
| Sample 2 | 3.0 | 0.25 | −26 | −37 |
| Sample 3 | 3.3 | 0.18 | −30 | −39 |
| Sample 4 | 3.1 | 0.28 | −24 | −33 |
| Sample 5 | 3.2 | 0.22 | −32 | −38 |

In general, according to the requested ability of the optical multiplexer/demultiplexer which is demanded by the wavelength division multiplexing transmission systems, 1 dB band width is at least 0.2 nm (preferably at least 0.24 nm), the adjacent crosstalk is at most −26 dB, and the background crosstalk is at most −30 dB.

If those required values are standard values, two samples among the samples 1 to 5 in Table 1 are defective and the yield becomes ⅗. Also, in the case where only the 1 dB band width among the standard values is equal to or larger than 0.24 nm which is a preferred value, four samples among the samples 1 to 5 in Table 1 are defective and the yield becomes ⅕.

As described above, even if the various structures proposed up to now are applied, the arrayed waveguide grating type optical multiplexer/demultiplexer that can satisfy all of the above first to fourth required characteristics of the optical multiplexer/demultiplexer is high in yield cannot be obtained.

In the above described conventional arrayed waveguide grating type optical multiplexer/demultiplexer and in the arrayed waveguide grating type optical multiplexer/demultiplexer which includes one of the tapered waveguide 2, the slit-shaped waveguide 50 and the parabolic waveguide 20 which are provided at the output end of the optical input waveguide 12, the present inventors simulated the optical amplitude distribution (optical amplitude) of light at the input end of the first slab waveguide 13 utilizing a beam propagation method and obtained the following conception from the above simulating results.

Figure 14:
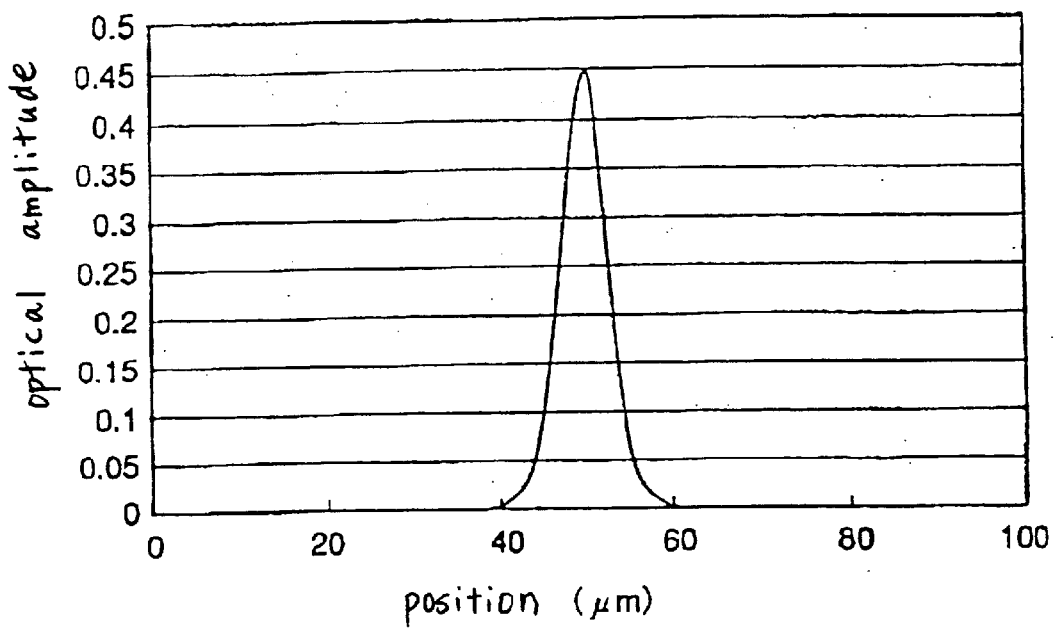
FIG. 14 is a graph showing an optical amplitude distribution of light at the output end of the optical input waveguide in the conventional arrayed waveguide grating optical multiplexer/demultiplexer.

That is, in the conventional arrayed waveguide grating type optical multiplexer/demultiplexer, the optical amplitude distribution is shaped in a mountain having one sharp peak as shown in FIG. 14, and the optical amplitude around the mountain is nearly 0.

Figure 15:
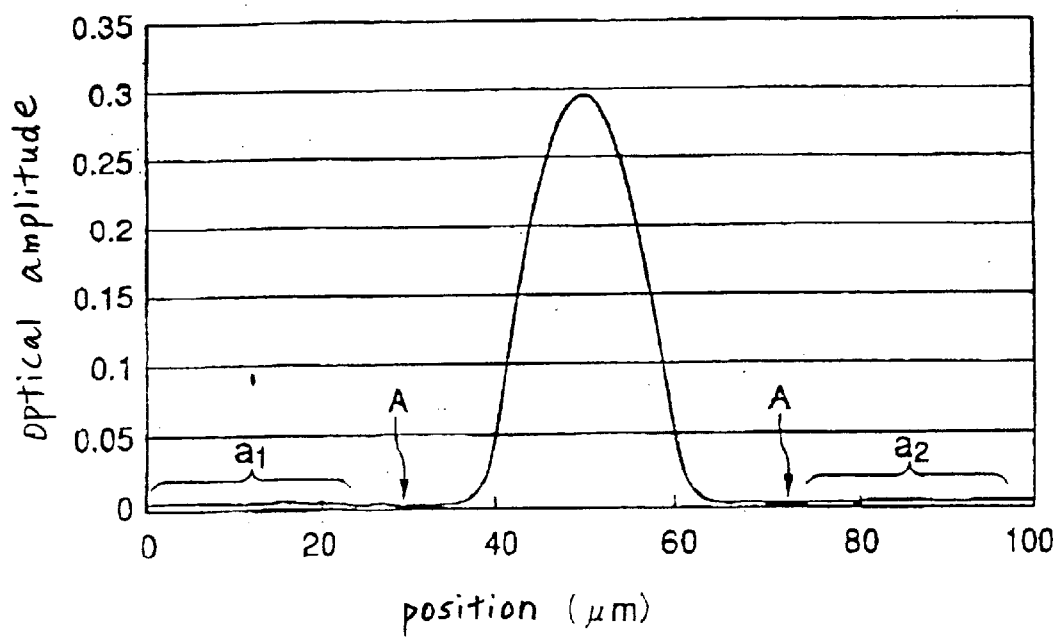
FIG. 15 is a graph showing the optical amplitude distribution at the output end of a tapered waveguide in the arrayed waveguide grating type optical multiplexer/demultiplexer in which a tapered waveguide is disposed at the output end of the optical input waveguide.

On the contrary, in the case where the tapered waveguide 2 is disposed at the output end of the optical input waveguide 12, the optical amplitude distribution has one mountain shape with one gentle peak as compared with a case where tapered waveguide 2 is not disposed, as shown in FIG. 15. Also, at both feet ends of the mountain are formed regions (a1 and a2) each having the gentle optical amplitude distribution through a portion the optical amplitude becomes nearly 0 (position (A) in FIG. 15). The regions (a1 and a2) spread the optical amplitude distribution in a direction apart from the center of the mountain peak.

Figure 16:
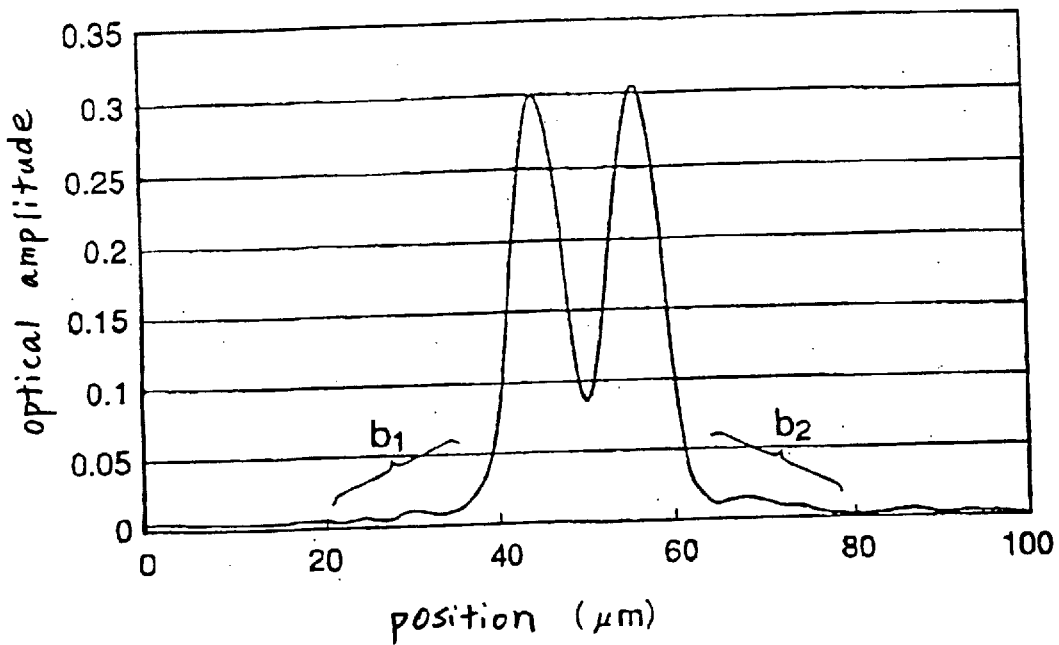
FIG. 16 is a graph showing the optical amplitude distribution at the output end of a slit-shaped waveguide in the arrayed waveguide grating type optical multiplexer/demultiplexer in which a slit-shaped waveguide is disposed at the output end of the optical input waveguide.

Also, in the case where the slit-shaped waveguide 50 is disposed at the output end of the optical input waveguide 12, the optical amplitude distribution has two peaks as shown in FIG. 16, gentle skirt portions (b1 and b2) are formed, and distributions that gently spread at the outer side of those two peaks (in directions apart from the peak centers) are also formed.

Figure 17:
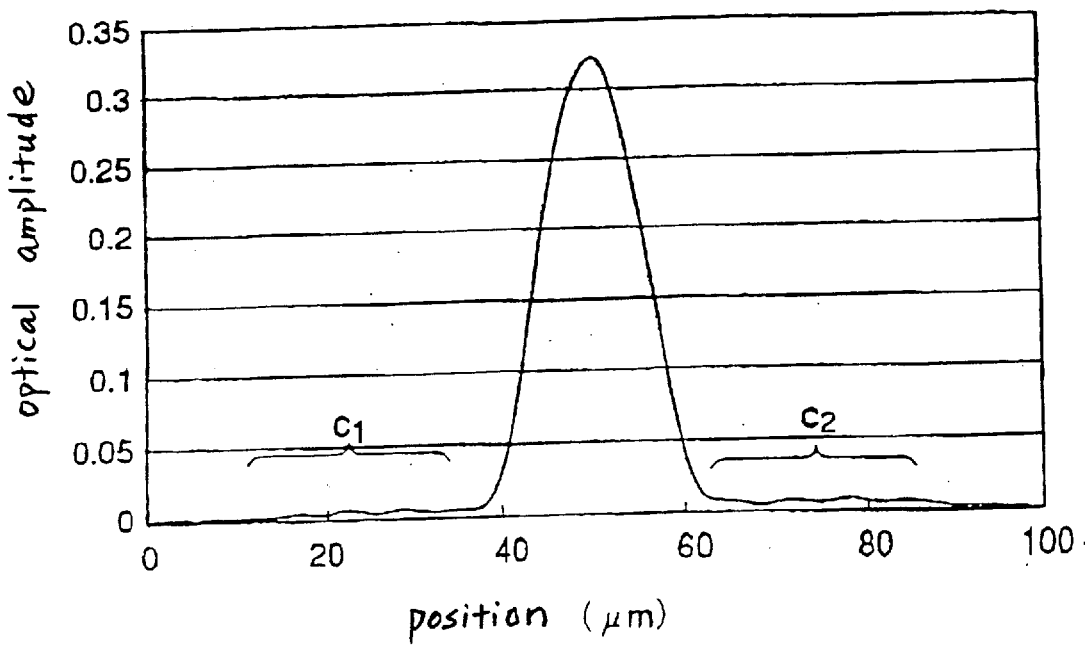
FIG. 17 is a graph showing the optical amplitude distribution at the output end of a parabolic waveguide in the arrayed waveguide grating type optical multiplexer/demultiplexer in which a parabolic waveguide is disposed at the output end of the optical input waveguide.

In addition, in the case where the parabolic waveguide 20 is disposed at the output end of the optical input waveguide 12, the optical amplitude distribution has one mountain with one gentle peak as compared with a case where parabolic waveguide 20 is not provided, as shown in FIG. 17. Also, pleated skirt distributions (c1 and c2) are formed on both ends of the mountain, but the optical amplitude distribution does not spread in directions apart from the center of the peak from the distributions (c1 and c2) portions.

The present inventors presume the following matters with reference to the respective optical amplitude distributions shown in FIGS. 14 to 17, and the study results can be related to the characteristics required for the optical multiplexer/demultiplexer. That is, if the width of portions close to the top of the mountain is wide, the 1 dB band width can be widened; in the case where the spread of the optical amplitude distribution from portions close to the top of the mountain is gentle, the adjacent crosstalk is deteriorated; in the case where the optical amplitude distribution spreads in a direction apart from the center of the peak, the background crosstalk is deteriorated.

Based on these inferences, in order to improve the optical loss, to broaden the 1 dB band width, and to improve the adjacent crosstalk and the background crosstalk, the present inventors consider that the optical amplitude distribution of light that is incident to the first slab waveguide 13 from one of the optical input waveguides 12 is made to have the shape of the following optical amplitude distribution at the entrance of the first slab waveguide 13.

That is, the present inventors have presumed that if the optical amplitude distribution of light incident to the above first slab waveguide 13 has a mountain shape with only one peak, the width of the top of that mountain is wider than the width of the optical distribution (refer to FIG. 14) of light incident to the first slab waveguide 13 in the arrayed waveguide grating type optical multiplexer/demultiplexer shown in FIG. 18, and the optical amplitude distribution is so shaped as not to provide any one of the regions (a1 and a2) shown in FIG. 15, the skirt portions (b1 and b2) shown in FIG. 16, and the pleated skirt portions (c1 and c2) shown in FIG. 17, the above effects can be exhibited.

Also, the present inventors have presumed that the above study results can be applied to not only the arrayed waveguide grating type optical multiplexer/demultiplexer, but also various waveguide circuits that constitute other optical multiplexer/demultiplexer or the like.

In order to create an arrayed waveguide grating type optical multiplexer/demultiplexer in which 1 dB band width is wide, adjacent crosstalk and the background crosstalk are low, and loss is low, the present inventors have conducted a variety of investigations while focusing on the structure of the junction between the optical input waveguides and the first slab waveguide.

Then, the present inventors have found out the following facts. That is, for example, the output end of each one of at least one optical input waveguide of the arrayed waveguide grating type optical multiplexer/demultiplexer is connected with the single mode end portion width waveguide having the following characteristic so that the optical amplitude distribution of light incident to the first slab waveguide from the optical input waveguide side (the optical amplitude distribution at the input end portion of the first slab waveguide) has a shape with one peak mountain in which the width of the top of that mountain is wide, and the skirt portions are cut off (that is, a shape having no regions (a1 and a2) shown in FIG. 15, no skirt portions (b1 and b2) shown in FIG. 16, and no pleated skirt portions (c1 and c2) shown in FIG. 17).

The single mode end portion width waveguide is, for instance, a trapezoidal waveguide 5 whose width increases toward the first slab waveguide side, the oblique lines thereof are almost straight, the upper base (the side facing the optical input waveguide) 4 of the trapezoidal waveguide is wider than the width of the optical input waveguides 12, and the width of the upper base 4 satisfies the single mode condition.

Accordingly, in the arrayed waveguide grating type optical multiplexer/demultiplexer according to the present embodiment of the present invention, the optical amplitude distribution of light incident to the first slab waveguide from the optical input waveguide side has a shape with one peak mountain in which portions close to the top are wide as described above by connecting the trapezoidal waveguide structured as described above, and the shkirts portions are cut off.

The width that satisfies the above single mode condition is obtained as follows. The normalized frequency ν of light that is propagated in an optical fiber is generally represented by the following expression 1.

$$v = k_0 a \sqrt{n_1^2 - n_0^2} \quad \text{(Exp. 1)}$$

where (a) is the core radius of the optical fiber, ($n_1$) is refractive index of core, ($n_0$) is refractive index of cladding, ($k_0$) is a normalized wave number which is given $k_0 = 2\pi/\lambda$. Note that, (λ) is the wavelength of light.

Also, when the above expression 1 is made to correspond to the rectangular waveguide, assuming that the width of the rectangular waveguide (or the height) is (W), it is proved that approximation can be relatively excellently made with a=w/2.5. Therefore, the expression 1 can be approximated by the following expression 2.

$$v = \frac{2\pi}{\lambda} \cdot \frac{w}{2.5} \sqrt{n_1^2 - n_0^2} = \frac{4\pi w}{5\lambda} \sqrt{n_1^2 - n_0^2} \quad \text{(Exp. 2)}$$

Also, in order to satisfy the single mode condition, it is necessary to satisfy the following expression 3, and an expression 4 is led from the expression 2 and the expression 3.

$$v < 2.4 \quad \text{(Exp. 3)}$$

$$w < \frac{3\lambda}{\pi \sqrt{n_1^2 - n_0^2}} \quad \text{(Exp. 4)}$$

For example, assuming that the relative refractive index difference (Δ) of the optical waveguide circuit such as the arrayed waveguide grating type optical multiplexer/demultiplexer is 0.8%, the wavelength (λ) of the propagating light is 1.55 μm, the refractive index ($n_1$) is 1.4560 and the refractive index ($n_0$) is 1.4443, then (w) is less than 8.03 μm.

In general, in the arrayed waveguide grating type optical multiplexer/demultiplexer used at present, if the width of the optical input waveguide is 6.5 μm and the upper base width of the trapezoidal waveguide is less than 8.03μm (for example, about 7.5 μm), the above single mode condition is satisfied, and the width can be made wider than the width of the corresponding optical input waveguide, the light incident to the trapezoidal waveguide spreads in the widthwise direction.

Figure 2:
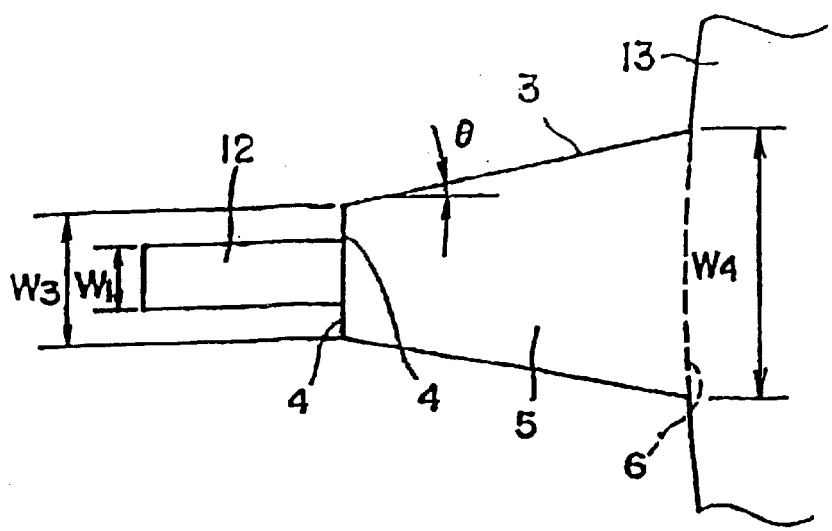
FIG. 2 is an explanatory diagram showing specifics of an output end of an optical input waveguide of the arrayed waveguide grating optical multiplexer/demultiplexer according to the first embodiment of the present invention.

Referring to FIGS. 1(*a*), 1(*b*) and 2, the arrayed waveguide grating type optical multiplexer/demultiplexer includes a trapezoidal waveguide (expanding width waveguide) 5 which has a trapezoidal shape having an upper base (a first end portion) 4 and a lower base (a second end portion) 6. The upper base 4 of the trapezoidal waveguide 5 is connected to an optical input waveguide 12 and the lower base 6 is connected to a first slab waveguide 13. The width (a second width) (W4) of the lower base 6 is larger than the width (a first width) (W3) of the upper base 4. Further, the first width (W3) satisfies the single mode condition. Referring to FIG. 2, the trapezoidal waveguide 5 that functions as the single mode end portion width waveguide is connected to the output end of the optical input waveguide 12 as the single mode waveguide. Also, the trapezoidal waveguide 5 is a wide width waveguide that widens toward the first slab waveguide 13 side.

As shown in FIG. 2, in this embodiment, the widths of the respective optical input waveguides 12 are (W1), and the end portion width (upper base 4) of the trapezoidal waveguide 5 opposite to the arrayed waveguide 14 is (W3). The trapezoidal waveguide 5 widens at a tapered angle θ, and the oblique line 3 of the trapezoidal waveguide 5 is substantially straight. The upper base 4 of the trapezoidal waveguide 5 has a width (W3) which is larger than the width of the corresponding optical input waveguide 12. The lower base 6 is slightly curved and has the width (W4).

In the present embodiment, the above parameters are set as follows: the width (W1) of each of the optical input guides 12 is equal to 6.5 μm, the width (W3) of the trapezoidal waveguide 5 at the upper base 4 is equal to 7.5 μm, the taper angle (θ) is equal to 0.2E, and the width (W4) of the trapezoidal waveguide 5 at the lower base 6 is equal to 19.0 μm. The arrayed waveguide grating type optical multiplexer/demultiplexer according to the first embodiment may multiplex and demultiplex optical signals in the 1.55 μm band whose wavelengths are different from each other by at least about 0.8 nm (in other words, with a frequency difference of at least about 100 GHz).

In this embodiment, one of the at least one optical input waveguide 12 is connected to, for example, transmission side optical fiber so that light that has undergone wavelength division multiplexing is introduced to one of the optical input waveguides 12. The light that has traveled through one of the optical input waveguides 12 enters the trapezoidal waveguide 5.

The light entered to the trapezoidal waveguide 5 is broadened along the width of the waveguide. The light then travels along the trapezoidal waveguide 5 while changing its optical amplitude distribution. And the width of the trapezoidal waveguide 5 increases toward the first slab waveguide 13, the width of the top portion in the optical amplitude distribution is widened, and the base portions of the optical amplitude distribution are cut off as the light travels.

Figure 3:
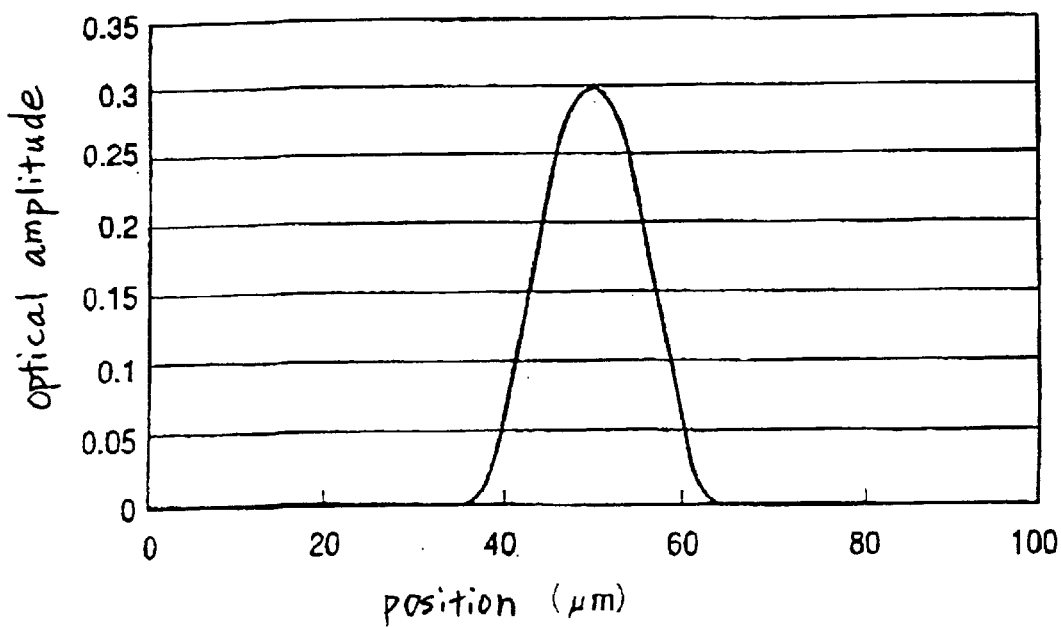
FIG. 3 is a graph showing an optical amplitude distribution of light at the output of the trapezoidal waveguide of the arrayed waveguide grating optical multiplexer/demultiplexer according to the first embodiment of the present invention.

FIG. 3 shows the optical amplitude distribution at the input end of the first slab waveguide 13 when the optical amplitude distribution is simulated through a beam propagation method. As shown in FIG. 3, the optical amplitude distribution has one top portion, and the width around the top portion is wide, and the rising of the skirt portions (both end sides of the optical amplitude distribution curve) is excellent, namely, the curve has no (a1 and a2) regions shown in FIG. 15, no skirt portions (b1 and b2) shown in FIG. 16 and no pleated skirt portions (c1 and c2) shown in FIG. 17.

According to the present embodiment, each optical input waveguide 12 is connected to the first slab waveguide 13 via each trapezoidal waveguide 5. Accordingly, the optical amplitude distribution changes as described above. The optical amplitude distribution of light at the output end of the trapezoidal waveguide 5 (in other words, at the entrance of the first slab waveguide 13) thus has the shape as shown in FIG. 3. This makes it possible to provide an arrayed waveguide grating type optical multiplexer/demultiplexer in which the 1 dB band width is wide, the optical loss is low, and the adjacent crosstalk and the background crosstalk are low.

Moreover, according to the present embodiment, each trapezoidal waveguide 5 has the width which increases toward the first slab waveguide 13 and has the oblique lines 3 that are substantially straight. Further, each optical input waveguide 12 is connected to the first slab waveguide 13 via each trapezoidal waveguide 5. Accordingly, an arrayed waveguide grating type optical multiplexer/demultiplexer with a simple structure may be obtained. Further, an arrayed waveguide grating type optical multiplexer/demultiplexer with a high yield may be readily manufactured.

A plurality of arrayed waveguide grating type optical multiplexers/demultiplexers according to the present embodiment were manufactured on the basis of the above design values, and the performances of those multiplexers/demultiplexers were studied.

Figure 4:
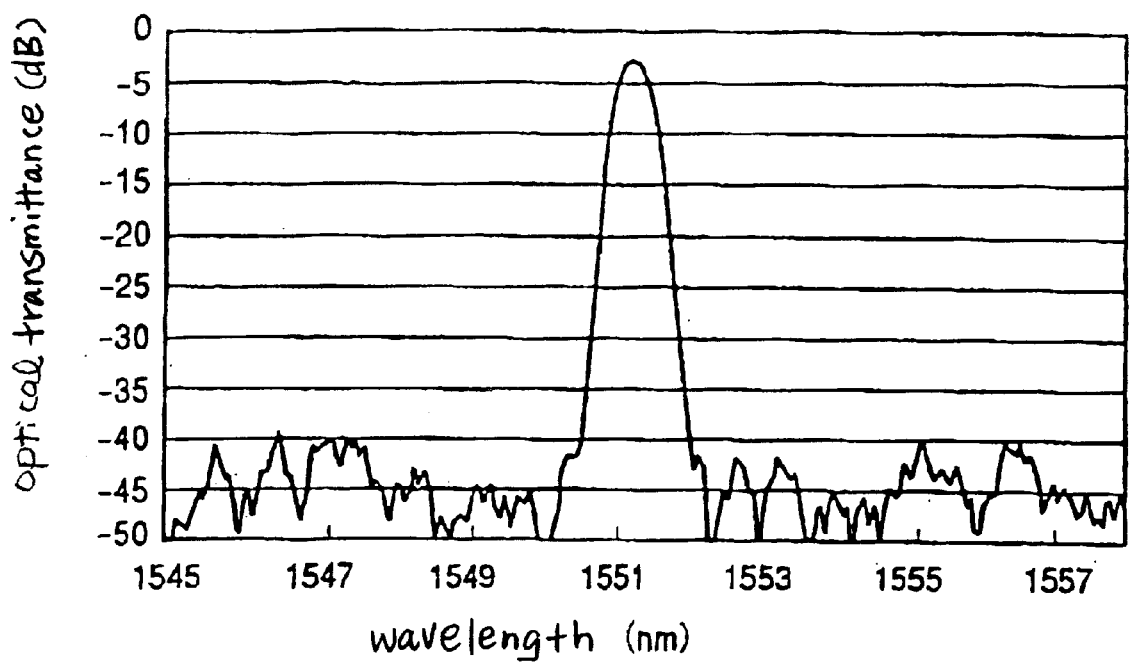
FIG. 4 is a graph showing the wavelength characteristic of the optical transmittance of the arrayed waveguide grating optical multiplexer/demultiplexer according to the first embodiment of the present invention.

As a result, the loss was 2.9 dB, the 1 dB band width was 0.26 nm, the adjacent crosstalk was −34 dB, and the background crosstalk was −37 dB. All characteristics were excellent. FIG. 4 shows a spectrum representative of the wavelength characteristic of the optical transmittance of the sample according to the present embodiment.

Also, as shown in Table 2, it can be recognized that the loss is low, the 1 dB band width is wide, the adjacent crosstalk and the background crosstalk are low, and the yields of the arrayed waveguide grating type optical multiplexer/demultiplexer are also high.

TABLE 2

|  | Optical loss (dB) | 1 dB band width (mm) | Adjacent crosstalk (dB) | Background crosstalk (dB) |
| --- | --- | --- | --- | --- |
| Prototype 1 | 2.8 | 0.26 | −33 | −39 |
| Prototype 2 | 2.9 | 0.30 | −31 | −42 |
| Prototype 3 | 2.7 | 0.27 | −35 | −38 |
| Prototype 4 | 2.8 | 0.25 | −34 | −43 |
| Prototype 5 | 2.8 | 0.24 | −32 | −38 |

Figure 5:
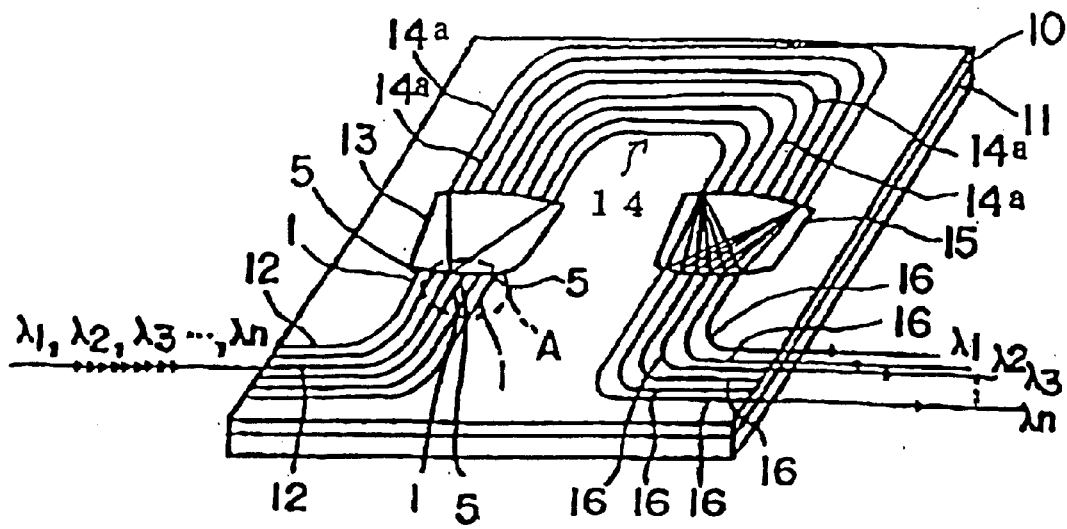
FIGS. 5(a) and 5(b) are structural diagrams schematically showing an arrayed waveguide grating optical multiplexer/demultiplexer according to a second embodiment of the present invention.
Figure 5:
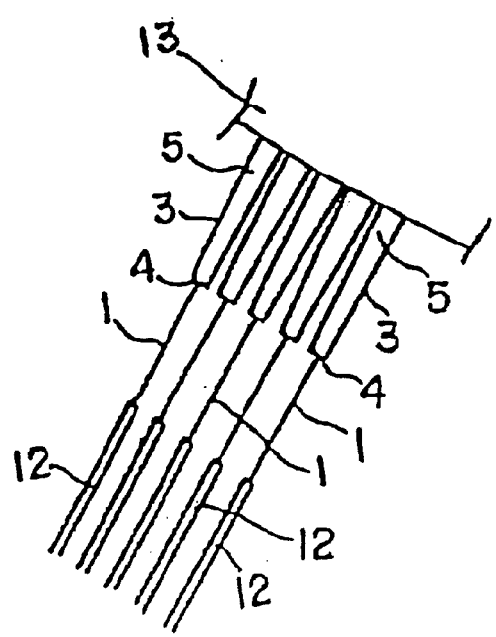
Figure 6:
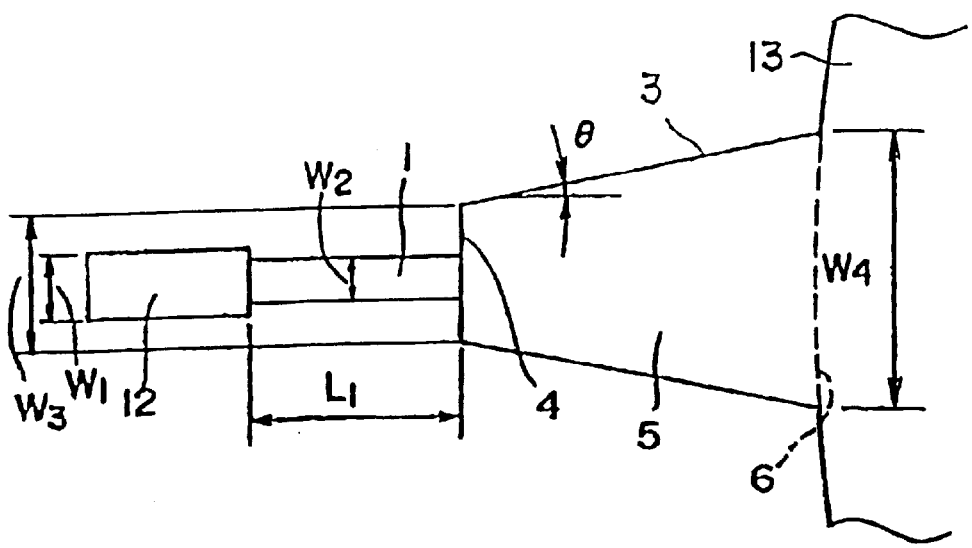
FIG. 6 is an explanatory diagram showing specifics of an output end of an optical input waveguide of the arrayed waveguide grating optical multiplexer/demultiplexer according to the second embodiment of the present invention.

Then, an arrayed waveguide grating type optical multiplexer/demultiplexer in accordance with a second embodiment of the present invention will be described. In the description of the second embodiment, the duplex description of the above-described first embodiment will be omitted. FIG. 5(a) schematically shows a perspective view of the main structure of the arrayed waveguide grating type optical multiplexer/demultiplexer in accordance with the second embodiment of the present invention together with its operation, and FIG. 5(b) shows an enlarged plan view of a portion surrounded by a dotted line (A) shown in FIG. 5(a). In addition, FIG. 6 shows the specific example of the end portion of one optical input waveguide 12 in the enlarged diagram.

In the second embodiment, a straight waveguide (narrow width straight waveguide) 1 is interposed between the optical input waveguide 12 and the trapezoidal waveguide 5. The width of the straight waveguide is narrower than that of the corresponding optical input waveguide 12.

The centers of the respective straight waveguides 1 in the widthwise direction are positioned at the center of the input ends of the corresponding trapezoidal waveguides 5 in the widthwise direction. The respective straight waveguides 1 form an optical power center position adjusting means that moves the power center of the light that has been propagated through the optical input waveguide 12 to the center of the straight waveguide 1 in the widthwise direction and makes the light power center incident to the center of the input end of the trapezoidal waveguide 5 in the widthwise direction. The width of the straight waveguide 1 is (W2) and its length is (L1).

In the second embodiment, for example, the width (W2) of the straight waveguide 1 is set to 3.0 μm, the length (L1) of the straight waveguide 1 is set to 500 μm, and other parameters (W1, W3, θ, W4) are the same values as the parameters in the above-described first embodiment. Also, the arrayed waveguide grating type optical multiplexer/demultiplexer according to the second embodiment may multiplex and demultiplex optical signals in the 1.55 μm band whose wavelengths are different from each other by at least about 0.8 nm.

The second embodiment is structured as described above, and in the second embodiment, the wavelength multiplexed light introduced into the optical input waveguide 12 is made incident to the straight waveguide 1, and the center of the optical power is moved to the center of the straight waveguide 1 by the straight waveguide 1, and the center of the optical power is made incident to the center of the trapezoidal waveguide 5 in the widthwise direction.

Then, the light incident to the trapezoidal waveguide 5 spreads in the waveguide widthwise direction as in the above first embodiment, and then advances while the optical amplitude distribution is changed in the trapezoidal waveguide 5. Then, it is presumed that the width of the optical amplitude distribution close to the mountain top portion expands and the skirt portions of the optical amplitude distribution are cut off as the light advances as described in the above first embodiment.

Figure 7:
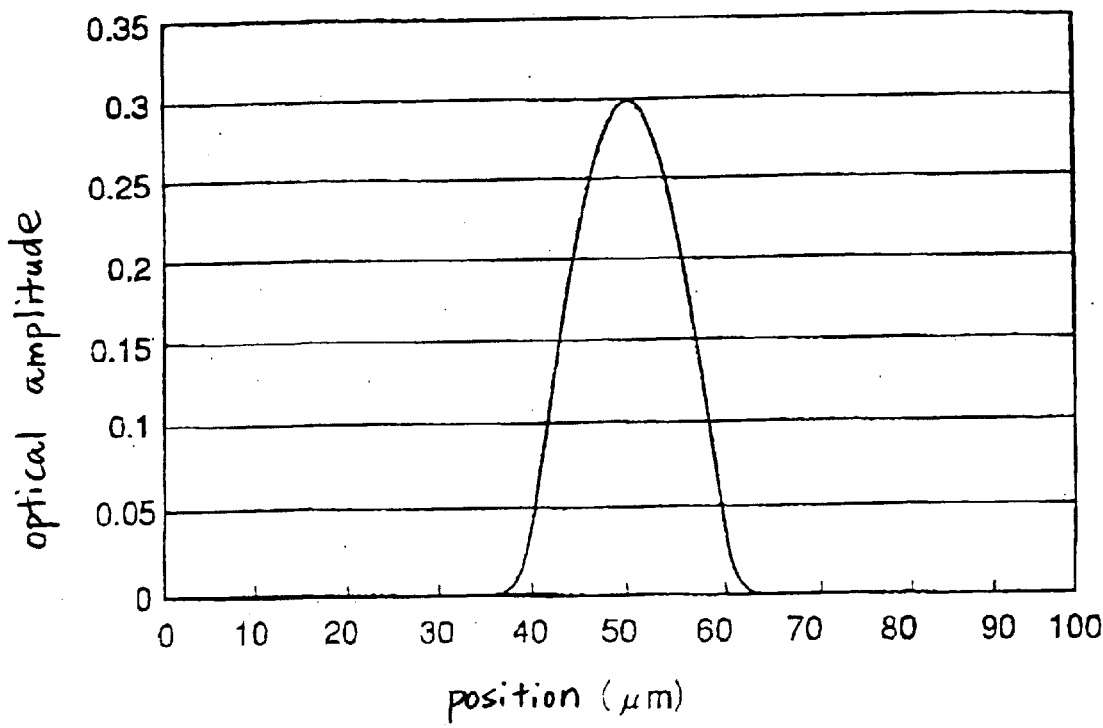
FIG. 7 is a graph showing an optical amplitude distribution of light at the output of the trapezoidal waveguide of the arrayed waveguide grating optical multiplexer/demultiplexer according to the second embodiment of the present invention.

FIG. 7 shows an optical amplitude distribution at the input end of the first slab waveguide 13 when the optical amplitude distribution is simulated through a beam propagation method. As shown in FIG. 7, the optical amplitude distribution has one top portion in which the width close to the top portion is wide and the rising of the skirt portion (both end sides) is excellent, as explained in the above first embodiment.

The second embodiment may have the same effects as those in the above first embodiment.

Also, in the second embodiment, since the straight waveguide 1 is interposed between the optical input waveguide 12 and the trapezoidal waveguide 5, the center of the light intensity can be made incident to the center of the trapezoidal waveguide 5 in the widthwise direction by the straight waveguide 1.

For that reason, in the second embodiment, even if the center position of the light intensity that is propagated through the optical input waveguide 12 is displaced from the center position of the optical input waveguide 12 in the widthwise direction, the center position of the optical intensity is made incident to the center of the trapezoidal waveguide 5 in the widthwise direction, and the optical amplitude distribution can be more surely made into the above shape, thereby being capable of providing the arrayed waveguide grating type optical multiplexer/demultiplexer which is excellent in the loss characteristic, the 1dB band width, the adjacent crosstalk and the background crosstalk.

Hereinafter, samples according to the second embodiment of the present invention will be described. A plurality of samples of the arrayed waveguide grating type optical multiplexers/demultiplexers according to the second embodiment were manufactured on the basis of the above design values, and the performances of those multiplexers/demultiplexers were studied.

As a result, the loss was 2.7 dB, the 1 dB band width was 0.26 nm, the adjacent crosstalk was −31 dB, and the background crosstalk was −37 dB. All characteristics were excellent. Also, as a result of studying the variations in the optical loss, the 1 dB band width, the adjacent crosstalk and the background crosstalk in the samples of the arrayed waveguide grating type optical multiplexer/demultiplexer having the same design of the above second embodiment, it was recognized that the variations among the samples were small.

Figure 8:
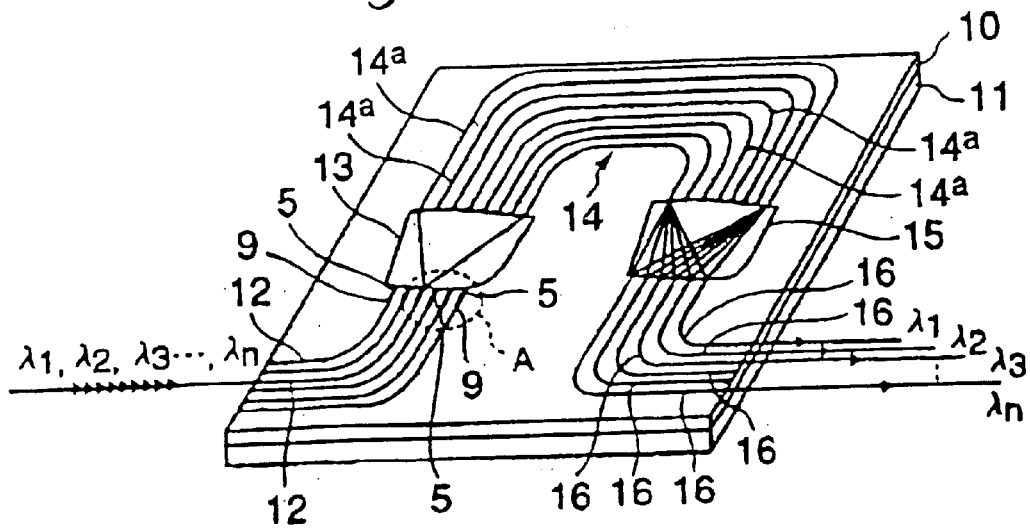
FIGS. 8(a) and 8(b) are structural diagrams schematically showing an arrayed waveguide grating optical multiplexer/demultiplexer according to a third embodiment of the present invention.
Figure 8:
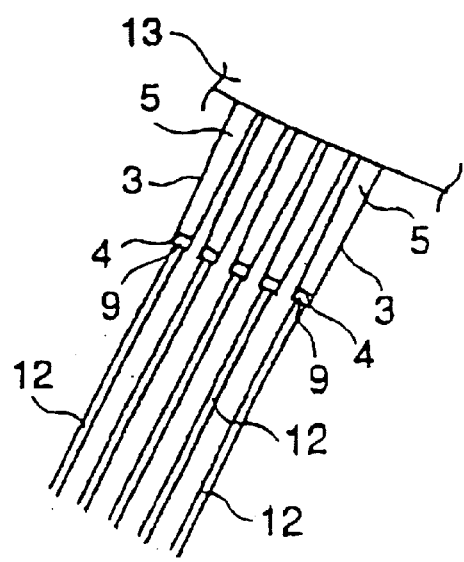
Figure 9:
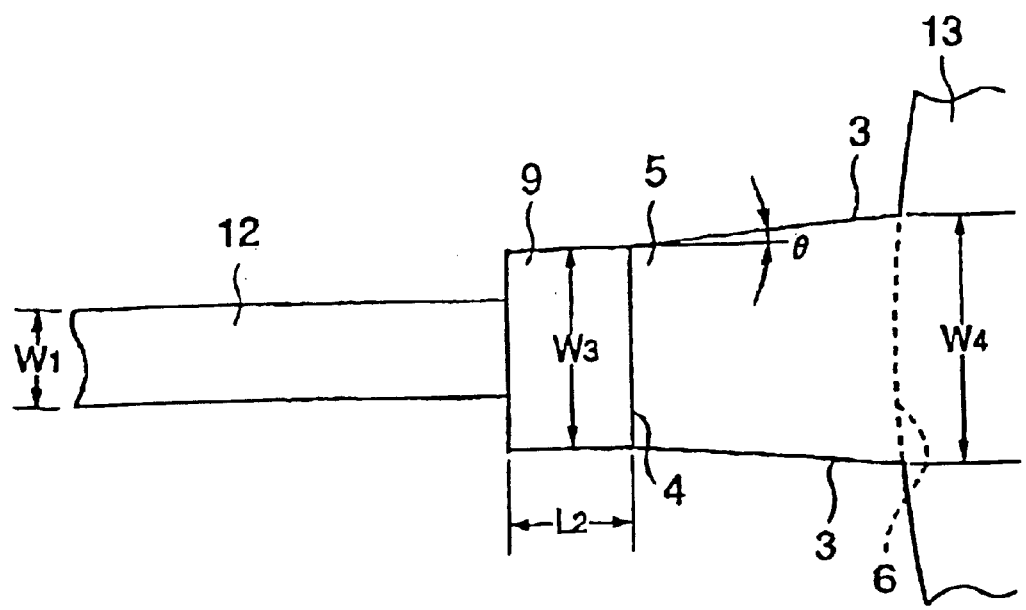
FIG. 9 is an explanatory diagram showing specifics of an output end of an optical input waveguide of the arrayed waveguide grating optical multiplexer/demultiplexer according to the third embodiment of the present invention.

Then, an arrayed waveguide grating type optical multiplexer/demultiplexer in accordance with a third embodiment of the present invention will be described. In the description of the third embodiment, the duplex description of the above-described first and second embodiments will be omitted. FIG. 8(a) schematically shows a perspective view of the main structure of the arrayed waveguide grating type optical multiplexer/demultiplexer in accordance with the third embodiment together with its operation, and FIG. 8(b) shows an enlarged plan view of a portion surrounded by a dotted line (A) shown in FIG. 8(a). In addition, FIG. 9 shows the specific example of the end portion of one optical input waveguide 12 in the enlarged diagram.

In the third embodiment, the optical input waveguide 12 is connected to the trapezoidal waveguide 5 via an equal width waveguide 9. The constant-width waveguide 9 has a width which is same as that of the narrow width end of the trapezoidal waveguide 5.

In the third embodiment, the trapezoidal waveguide 5 that functions as the wide width waveguide that widens toward the arrayed waveguide side is disposed at the output end of the constant-width waveguide 9 that functions as the single mode waveguide.

In the third embodiment, for example, the width (W3) of the constant-width waveguide 9 (the width of the upper base 4 of the trapezoidal waveguide 5) is set to 7.5 $\mu$m, the length (L2) of the constant-width waveguide 9 is set to 250 $\mu$m, and other parameters (W1, θ, W4) are the same values as the parameters in the above-described first embodiment. Also, the arrayed waveguide grating type optical multiplexer/demultiplexer according to the third embodiment may multiplex and demultiplex optical signals in the 1.55 $\mu$m band whose wavelengths are different from each other by at least about 0.8 nm.

Figure 10:
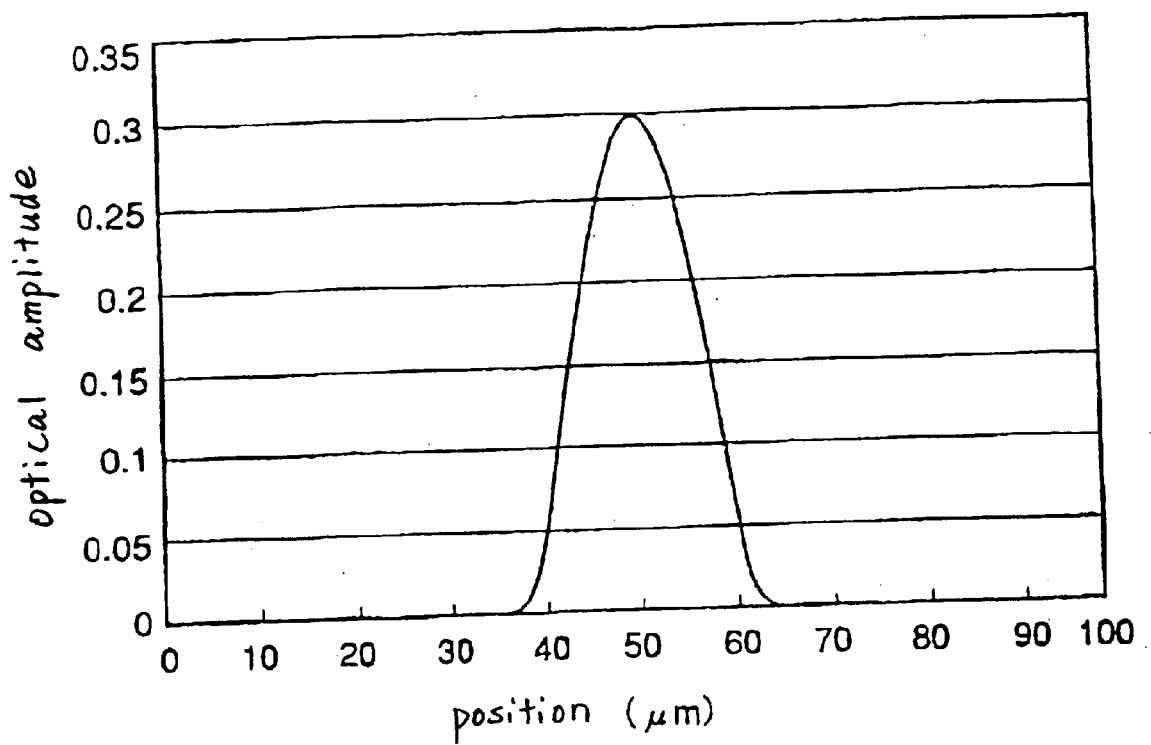
FIG. 10 is a graph showing an optical amplitude distribution of light at the output of the trapezoidal waveguide of the arrayed waveguide grating optical multiplexer/demultiplexer according to the third embodiment of the present invention.

FIG. 10 shows an optical amplitude distribution at the incident end of the first slab waveguide 13 when the optical amplitude distribution is simulated through a beam propagation method. The optical amplitude distribution shown in the figure has one top portion. The width close to the top portion is wide and the rising of the skirt portion (both end sides) is excellent, as explained in the above first embodiment.

Therefore, the same effect as the first embodiment can be obtained also in the third embodiment through the same mechanism.

Thereinafter, samples according to the third embodiment of the present invention will be described. A plurality of samples of the arrayed waveguide grating optical multiplexer/demultiplexer according to the third embodiment were manufactured on the basis of the above design values, and the performances of the multiplexers/demultiplexers were studied.

As a result, the loss was 2.8 dB, the 1 dB band width was 0.26 nm, the adjacent crosstalk was −31 dB, and the background crosstalk was −32 dB. Also, as a result of studying the variations in the loss, the 1 dB band width, the adjacent crosstalk and the background crosstalk in the samples of the arrayed waveguide grating type optical ltiplexer/demultiplexer having the same design of the third embodiment, it was recognized that the variations among the samples were small.

Figure 11:
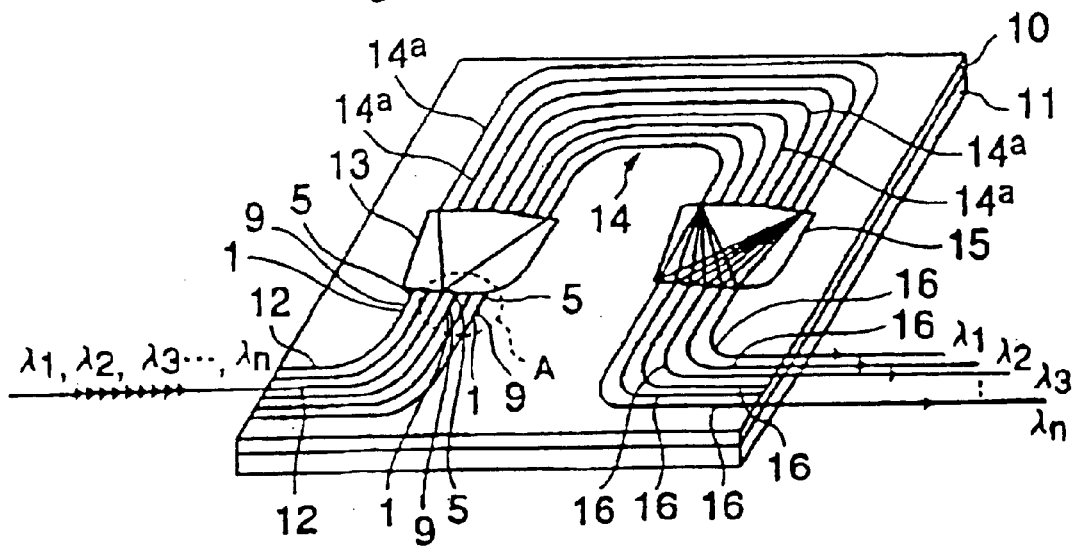
FIGS. 11(a) and 11(b) are structural diagrams schematically showing an arrayed waveguide grating optical multiplexer/demultiplexer according to a fourth embodiment of the present invention.
Figure 11:
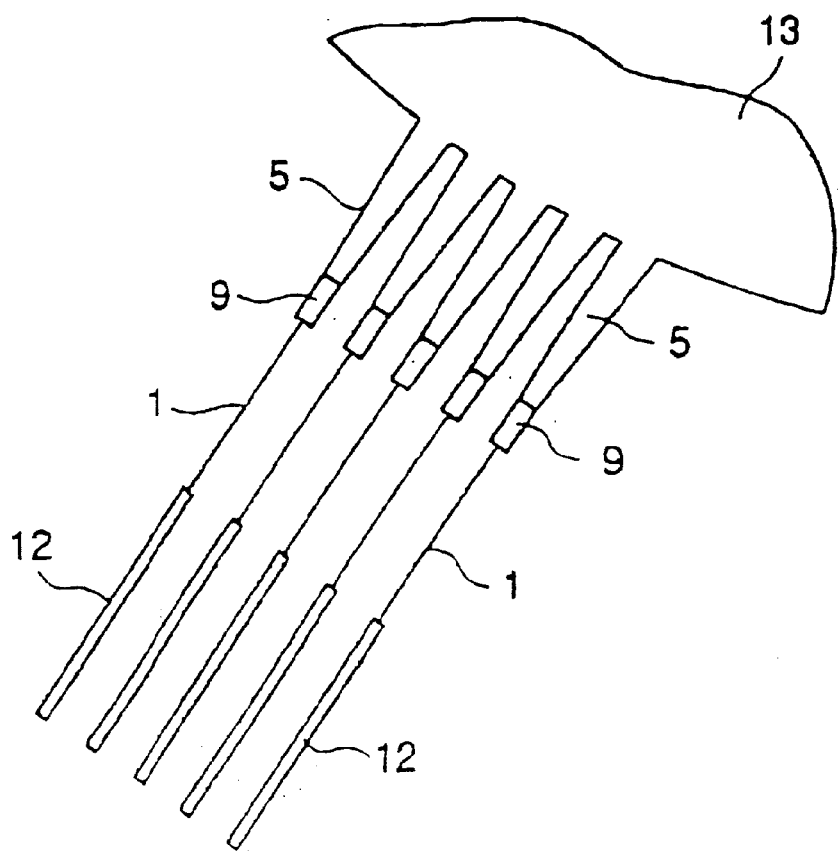
Figure 12:
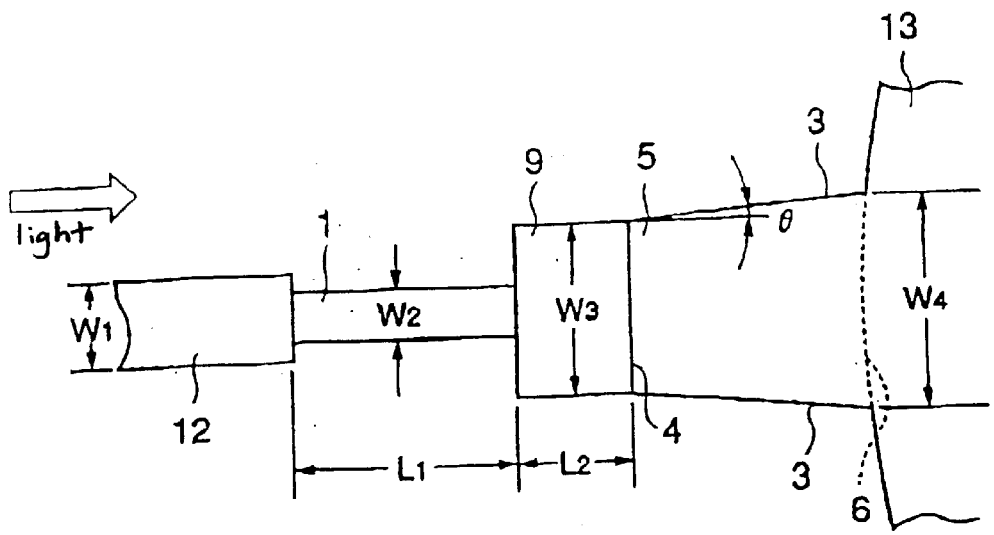
FIG. 12 is an explanatory diagram showing specifics of an output end of an optical input waveguide of the arrayed waveguide grating optical multiplexer/demultiplexer according to the fourth embodiment of the present invention.

Then, an arrayed waveguide grating type optical multiplexer/demultiplexer in accordance with a fourth embodiment of the present invention will be described. In the description of the fourth embodiment, the duplex description of the above-described respective embodiments will be omitted. FIG. 11(a) schematically shows a perspective view of the main structure of the arrayed waveguide grating type optical multiplexer/demultiplexer in accordance with the fourth embodiment together with its operation, and FIG. 11(b) shows an enlarged plan view of a portion surrounded by a dotted line (A) shown in FIG. 11(a). In addition, FIG. 12 shows the specific example of the end portion of one optical input waveguide 12 in the enlarged diagram.

In the fourth embodiment, the optical input waveguide 12 is connected to the trapezoidal waveguide 5 via a straight waveguide (narrow width straight waveguide) 1 and a constant-width waveguide 9. The width of the straight waveguide 1 is narrower than the width of the optical input waveguide 12.

The centers of the respective straight waveguides 1 in the widthwise direction are positioned at the center of the incident ends of the corresponding constant-width waveguides 9 in the widthwise direction. The respective straight waveguides 1 move the power center of the light that has been propagated through the optical input waveguide 12 to the center of the straight waveguide 1 in the widthwise direction and makes the light power center incident to the center of the incident end of the constant-width waveguide 9 in the widthwise direction. The width of the straight waveguide 1 is (W2) and its length is (L1).

In the fourth embodiment, for example, the width (W2) of the straight waveguide 1 is set to 3.0 $\mu$m, the length (L1) of the straight waveguide 1 is set to 500 μm, and other parameters (W1, W3, θ, W4, L2) are set to the same values as the parameters in the above-described third embodiment. Also, the arrayed waveguide grating type optical multiplexer/demultiplexer according to the fourth embodiment may multiplex and demultiplex optical signals in the 1.55 μm band whose wavelengths are different from each other by at least about 0.8 nm.

The fourth embodiment is structured as described above, and in the fourth embodiment, the wavelength multiplex light introduced into the optical input waveguide 12 is made incident to the straight waveguide 1, and the center of the optical power is moved to the center of the straight waveguide 1 by the straight waveguide 1, and the center of the light power is made incident to the center of the constant-width waveguide 9 in the widthwise direction.

Then, the light incident to the constant-width waveguide 9 spreads in the waveguide widthwise direction as explained in the above second embodiment, and is then advanced while the optical amplitude distribution is changed in the trapezoidal waveguide 5 with the same effects as those in the above third embodiment.

Figure 13:
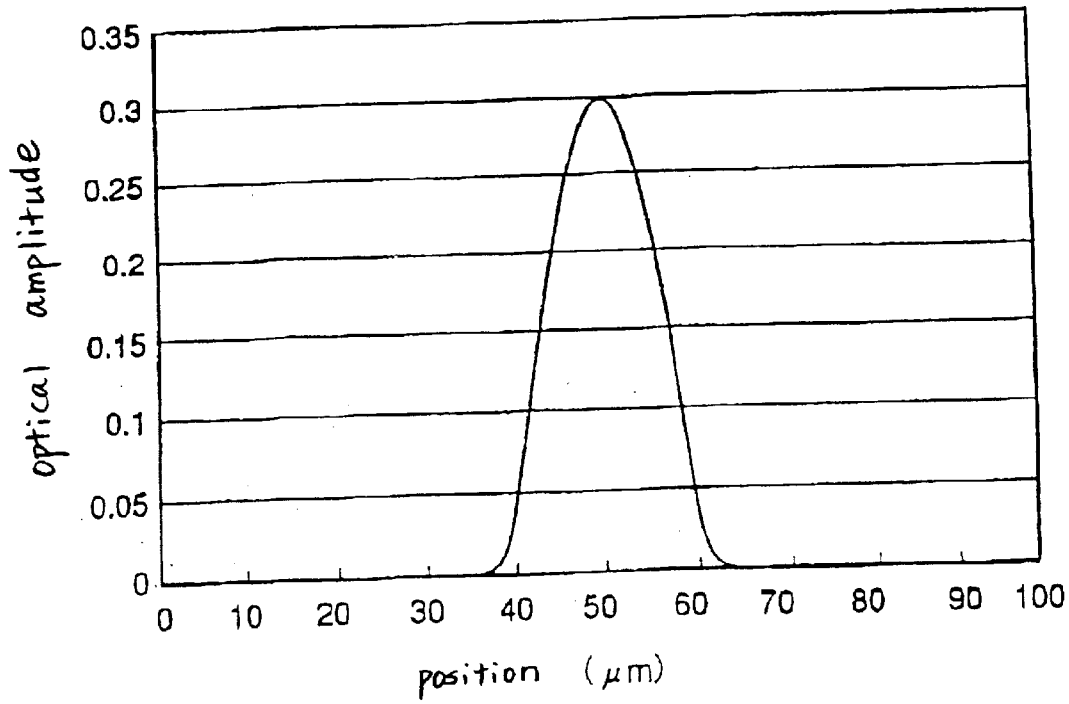
FIG. 13 is a graph showing an optical amplitude distribution of light at the output of the trapezoidal waveguide of the arrayed waveguide grating optical multiplexer/demultiplexer according to the fourth embodiment of the present invention.

FIG. 13 shows an optical amplitude distribution at the incident end of the first slab waveguide 13 when the optical amplitude distribution is simulated through a beam propagation method. The optical amplitude distribution shown in FIG. 13 has one top portion in which the width close to the top portion is wide and the rising of the skirts portion (both end sides) is excellent, as explained in the above respective embodiments.

Also, in the fourth embodiment, since the straight waveguide 1 is interposed between the optical input waveguide 12 and the constant-width waveguide 9, the center of the light intensity can be made incident to the center of the constant-width waveguide 9 in the widthwise direction by the straight waveguide 1.

For that reason, in the fourth embodiment, even if the center position of the light intensity that is propagated through the optical input waveguide 12 is displaced from the center position of the optical input waveguide 12 in the widthwise direction, the center position of the light intensity is made incident to the center of the constant-width waveguide 9 in the widthwise direction, and the optical amplitude distribution can be more surely made into the shape as shown in FIG. 13. Accordingly, the arrayed waveguide grating type optical multiplexer/demultiplexer which is excellent in the loss characteristic, the 1 dB band width, the adjacent crosstalk and the background crosstalk may be obtained.

Hereinafter, samples according to the fourth embodiment of the present invention will be described. A plurality of samples of the arrayed waveguide grating type optical multiplexers/demultiplexers according to the fourth embodiment were manufactured on the basis of the above design values, and the performances of those multiplexers/demultiplexers were studied.

As a result, the loss was 2.8 dB, the 1 dB band width was 0.26 nm, the adjacent crosstalk was −30 dB, and the background crosstalk was −35 dB. Also, as a result of studying the variations in the loss, the 1 dB band width, the adjacent crosstalk and the background crosstalk in the arrayed waveguide grating type optical multiplexer/demultiplexer having the same design of the above fourth embodiment, it was recognized that all the variations among the samples were small.

Thus, according to the above described embodiments of the present invention, a superior arrayed waveguide grating type optical multiplexer/demultiplexer having the excellent effects mentioned above may be obtained.

Figure 25:
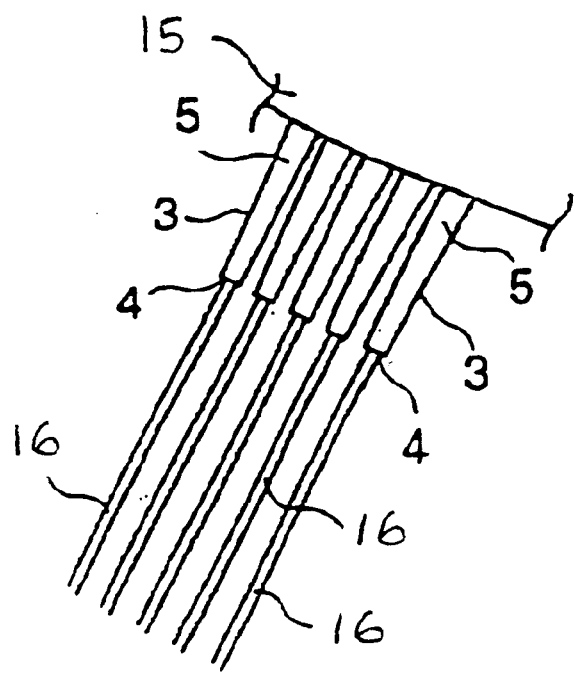
FIG. 25 is a structural diagram schematically showing a portion of an arrayed waveguide grating optical multiplexer/demultiplexer according to an embodiment of the present invention.
Figure 26:
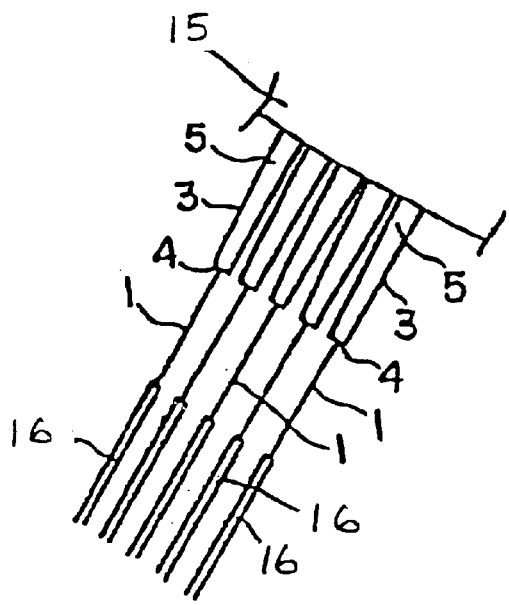
FIG. 26 is a structural diagram schematically showing a portion of an arrayed waveguide grating optical multiplexer/demultiplexer according to another embodiment of the present invention.
Figure 27:
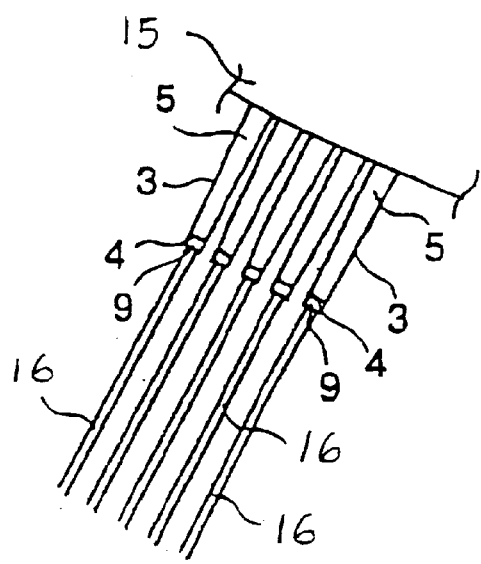
FIG. 27 is a structural diagram schematically showing a portion of an arrayed waveguide grating optical multiplexer/demultiplexer according to yet another embodiment of the present invention.
Figure 28:
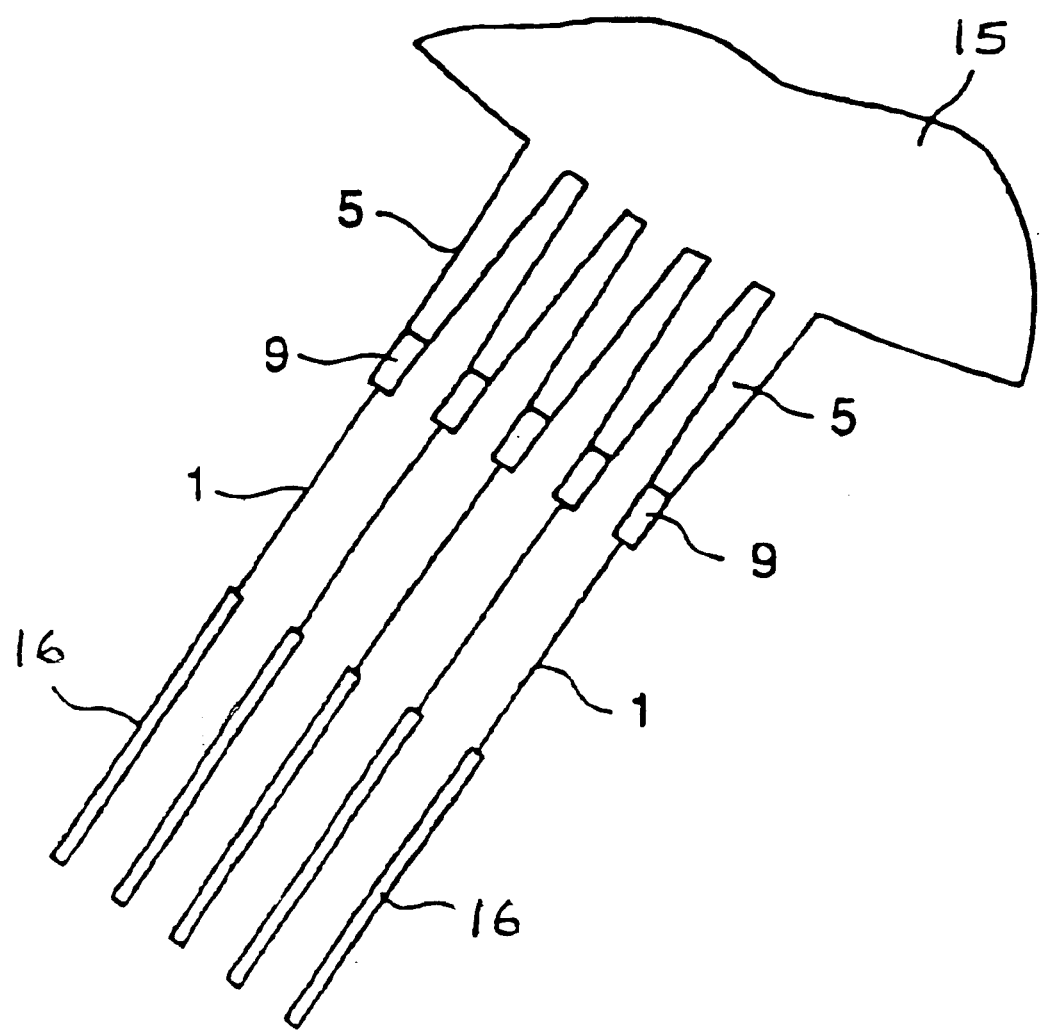
FIG. 28 is a structural diagram schematically showing a portion of an arrayed waveguide grating optical multiplexer/demultiplexer according to another embodiment of the present invention.
Figure 29:
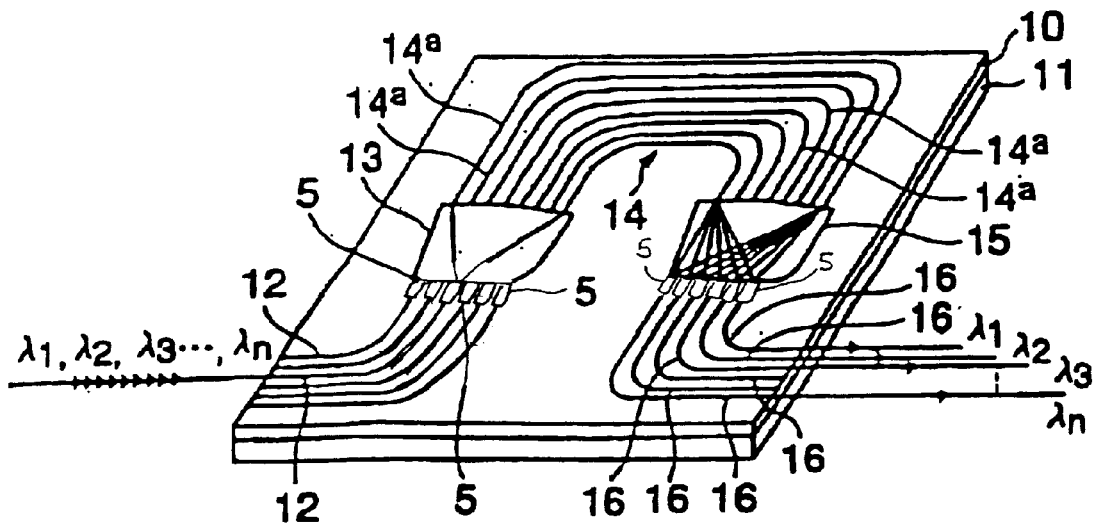
FIG. 29 is a structural diagram schematically showing an arrayed waveguide grating optical multiplexer/demultiplexer according to another embodiment of the present invention.
Figure 30:
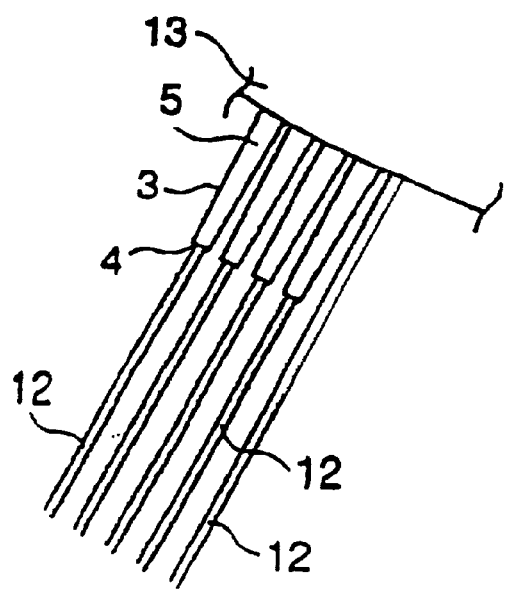
FIG. 30 is a structural diagram schematically showing a portion of an arrayed waveguide grating optical multiplexer/demultiplexer according to another embodiment of the present invention.

The present invention is not limited to the above described embodiments, but can adopt numerous modifications and variations. For example, referring to FIG. 25, each of all optical output waveguides 16 may be connected to the second slab waveguide 15 via each trapezoidal waveguide 5. Referring to FIG. 26, each trapezoidal waveguide 5 may be connected to each of all optical output waveguides 16 via each straight wavegude 1. Further, referring to FIG. 27, each trapezoidal waveguide 5 may be connected to each of all optical output waveguides 16 via each equal width waveguide 9. Furthermore, referring to FIG. 28, each trapezoidal waveguide 5 may be connected to each of all optical output waveguides 16 via each straight waveguide 1 and each equal width waveguide 9. Further, referring to FIG. 29, each optical input waveguide 12 may be connected to the first slab waveguide 13 via each trapezoidal waveguide 5, and each of all optical output waveguides 16 may also be connected to the second slab waveguide 15 via each trapezoidal waveguide 5. In FIG. 29, each trapezoidal waveguide 5 may be connected to each optical input waveguide 12 via each straight wavegude and/or each equal width waveguide. Further, in FIG. 29, each trapezoidal waveguide 5 may be connected to each optical output waveguide 16 via each straight wavegude and/or each equal width waveguide. Furthermore, referring to FIG. 30, some of all optical input waveguides 12 may be connected to the first slab waveguide 13 via each trapezoidal waveguide 5, and other optical input waveguides 12 may be directly connected to the first slab waveguide 13 without interposing the trapezoidal waveguide 5.

In the above described embodiments, the width of the trapezoidal waveguide 5 increases toward the arrayed waveguide 14 side, and the end portion width of the trapezoidal waveguide 5 opposite to the arrayed waveguide 14 is wider than the width of the corresponding optical input waveguide 12 or optical output waveguide 16 and satisfies the single mode condition. Therefore, above described effects may be obtained.

When each trapezoidal waveguide 5 is provided at each output end of a plurality of optical output waveguides 16, the straight waveguide 1 as the one described in the second embodiment may be interposed between each optical output waveguide 16 and each trapezoidal waveguide 5. It is also possible to form the constant width waveguide 9 and/or the straight waveguide (narrow straight waveguide) 1 between each optical output waveguide 16 and each trapezoidal waveguide 5 as explained in the third and fourth embodiments.

The width of the upper base 4 of the trapezoidal waveguide 5 has to be wider than the optical output waveguides 16 and width of the upper base 4 satisfies the single mode condition if each trapezoidal waveguide 5 is provided at each output end of the optical output waveguides 16. On the other hand, the straight waveguide 1 has to be narrower than the optical output waveguides 16 if each straight waveguide 1 is interposed between each optical output waveguide 16 and each trapezoidal waveguide 5. Further, for example, the oblique lines of the trapezoidal waveguide 5 can be substantially straight.

The embodiments according to the present invention does not put particular limitation in the width, the length and the taper angle of the trapezoidal waveguide, the width and the length of the straight waveguide, and the length of the constant width waveguide, and these parameters are suitably set. If these parameters are set in accordance with specifications of an arrayed waveguide grating type optical multiplexer/demultiplexer and based on the results of simulation of the optical amplitude distribution as shown in FIGS. 3, 7, 10, and 13, for example, the arrayed waveguide grating type optical multiplexer/demultiplexer can have the excellent effects described in the above embodiments.

The expanding width waveguide to be applied to the arrayed waveguide grating type optical multiplexer/ demultiplexer according to the embodiments of the present invention does not necessarily include trapezoidal waveguide. It is sufficient for the single mode end portion width waveguide to be wider than a width of a corresponding optical input waveguide and an optical output waveguide, and to have a wide enough end portion width satisfying the single mode condition and to have a wide width waveguide increasing toward the arrayed waveguide in at least a part thereof a waveguide.

The structure of the expanding width waveguide according to the embodiments of the present invention as shown in, for example, FIGS. 2, 6, 9 and 12 are adopted as a part of the circuit structure of the arrayed waveguide grating type optical multiplexer/demultiplexer in the above embodiments. However, the expanding width waveguide according to the embodiments of the present invention can be applied to an optical waveguide circuit of a circuit structure other than the arrayed waveguide grating type optical multiplexer/demultiplexer.

Further, the expanding width waveguide according to the embodiments of the present invention is not always limited to the structure having the trapezoidal waveguide, but may be structured in such a manner that the single mode end portion width waveguide has an end portion width that is wider than the width of the corresponding optical input waveguide or optical output waveguide and satisfies the single mode condition, and the wide width waveguide that widens toward the arrayed waveguide side is disposed on at least a part of the single mode end portion width waveguide.

As was described above, in the arrayed waveguide grating type optical multiplexer/demultiplexer according to the embodiments of the present invention, the single mode end portion width waveguide having an end portion width which is wider than the width of the corresponding optical input waveguide and satisfies the single mode condition is connected to, for example, an output end of the optical input waveguide, and the wide width waveguide that widens toward the arrayed waveguide side is disposed on at least a part of the single mode end portion width waveguide. The end portion (an end portion of the optical input waveguide side) of the single mode end portion width waveguide opposite to the arrayed waveguide has a width which is wider than the width of the corresponding optical input waveguide and satisfies the single mode condition.

In the thus structured arrayed waveguide grating type optical multiplexer/demultiplexer according to the embodiments of the present invention, the loss is low, the 1 dB band width is wide, and the adjacent crosstalk and background crosstalk are low.

The above single mode end portion width waveguide can be formed of, for example, a trapezoidal waveguide that widens toward the arrayed waveguide side. Also, the single mode end portion width waveguide can be so structured as to have a trapezoidal waveguide as the wide width waveguide. In this case, the light is widened in the widthwise direction of the trapezoidal waveguide, and thereafter the optical amplitude distribution can be shaped into one mountain in which the width close to the top is wide and the rising of the skirt portions is excellent, thereby being capable of providing the above effects.

Furthermore, the structure according to the embodiments of the present invention is simple, and hence can provide an arrayed waveguide grating type optical multiplexer/demultiplexer with a high yield which is easy to manufacture.

Also, because the arrayed waveguide grating type optical multiplexer/demultiplexer has the reciprocity of an optical circuit, in the arrayed waveguide grating type optical multiplexer/demultiplexer according to the embodiments of the present invention, even in the case where each single mode end portion width waveguide having an end portion width which is wider than the width of the corresponding optical output waveguide and satisfies the single mode condition is connected to each entrance end of the optical output waveguide, and the wide width waveguide that widens toward the arrayed waveguide side is disposed on at least a part of the single mode end portion width waveguide, the same effects can be obtained.

Similarly, in this case, the above single mode end portion width waveguide can be formed of, for example, a trapezoidal waveguide that widens toward the arrayed waveguide side. Also, the single mode end portion width waveguide can be so structured as to have a trapezoidal waveguide as the wide width waveguide.

It is also possible to obtain the same effect as above with an arrayed waveguide grating type optical multiplexer/demultiplexer in which an constant width waveguide as narrow as the narrower width end of the trapezoidal waveguide is formed at the narrower width end of the trapezoidal waveguide.

The arrayed waveguide grating type optical multiplexer/demultiplexer according to the embodiments of the present invention is capable of making the overall intensity distribution shape of light that outputs from the wide width waveguide such as the trapezoidal waveguide free from deformation. This is achieved by providing a straight waveguide narrower than the optical input waveguides between each optical input waveguide and such as each trapezoidal waveguide. Alternatively, this is achieved by providing, in the structure where the constant width waveguide is formed, a narrow straight waveguide between the constant waveguide and its associated optical input waveguide. Because of the narrow straight waveguide, even if each of the optical input waveguides has a curved portion and the central position of the light intensity distribution deviates from the center in width of the optical input waveguide after the light has traveled through this curved portion, the central position of the light intensity distribution can be moved to the center of the straight waveguide when the light travels along the straight waveguide. The light intensity center thus can be inputted in the center in the width direction of the wide width waveguide of such as the trapezoidal waveguide.

The arrayed waveguide grating type optical multiplexer/demultiplexer utilizes the reciprocity of the optical circuit. It is therefore possible to obtain the same effect as above also with the arrayed waveguide grating type optical multiplexer/demultiplexer according to the embodiments of the present invention in which the straight waveguide narrower than the optical output waveguide is interposed between each wide width waveguide such as the trapezoidal waveguide and each of the optical output waveguides. Furthermore, the arrayed waveguide grating type optical multiplexer/demultiplexer according to the embodiments of the present invention in which the narrow straight waveguide is interposed between each constant width waveguide and each of the optical output waveguides can also provide the same effect.

Further, in the optical waveguide circuit according to the embodiments of the present invention, the single mode end portion width waveguide having an end portion width which is wider than the width of the single mode waveguide and satisfies the single mode condition is connected to the single mode waveguide, and the wide width waveguide that widens toward arrayed waveguide side is disposed on at least a part of the single mode end portion width waveguide. With this structure, the optical amplitude distribution can be shaped into one mountain in which the width close to the top is wide and the rising of the skirt portions is excellent.

Accordingly, the above structure is applied to various circuit structures such as the arrayed waveguide grating type optical multiplexer/demultiplexer, it is capable of improving the flatness of, for example, a light that is multiplexed and demultiplexed and of exhibiting such effects that the adjacent crosstalk and the background crosstalk can be lessened.

In the optical waveguide circuit according to the embodiments of the present invention where the single mode end portion width waveguide is such as the trapezoidal waveguide, the above effects can be efficiently exerted with a very simple structure.

The embodiments of the present invention place the single mode end portion width waveguide whose width increases toward the arrayed waveguide, such as the trapezoidal waveguide described above, on the output end of each of the optical input waveguides, for example. This makes it possible to form the optical amplitude distribution of light that is outputted from the single mode end portion width waveguide to enter the first slab waveguide into a mountain shape in which the width close to the top of the mountain is wide and the skirt portions are cut off. The embodiments of the present invention thus can provide an arrayed waveguide grating type optical multiplexer/demultiplexer in which the 1 dB band width is wide, the loss is low, and the adjacent crosstalk and background crosstalk are low.

The single mode end portion width waveguide can be made into, for example, a trapezoidal waveguide per se as described above or can be so structured as to have a trapezoidal waveguide as the wide width waveguide.

In particular, the embodiments of the present invention is capable of making the overall intensity distribution shape of light that is outputted from the trapezoidal waveguide free from deformation. This is achieved by providing a straight waveguide narrower than the optical input waveguide between, for example, the optical input waveguide and the trapezoidal waveguide. Because of this straight waveguide, even if the optical input waveguide has a curved portion and the central position of the light intensity distribution is deviated from the center in width of the optical input waveguide after the light has traveled through this carved portion, the central position of the light intensity distribution can be moved to the center of the straight waveguide during the light travels along the straight waveguide. The light intensity center thus can be inputted in the center in width of the trapezoidal waveguide.

Since the arrayed waveguide grating type optical multiplexer/demultiplexer is formed by utilizing the reciprocity of an optical circuit, similarly in the case where each of input ends of the respective optical output waveguides is connected with each single mode end portion width waveguide having an end portion width that is wider than the width of the corresponding optical output waveguide and satisfies the single mode condition, and the wide width waveguide which is widened toward the arrayed waveguide side is disposed on at least a part (in its longitudinal direction) of the single mode end portion width waveguide, there can be provided the arrayed waveguide grating type optical multiplexer/demultiplexer in which the 1 dB band width is wide, the loss is low, and the adjacent crosstalk and the background crosstalk are low.

In the above case, the single mode end portion width waveguide has the width at a optical output waveguide side which is wider than the width of the corresponding optical output waveguide and satisfies the single mode condition.

Since the structure of the arrayed waveguide grating type optical multiplexer/demultiplexer according to the embodiments of the present invention is simple, manufacturing thereof is easy and it makes an arrayed waveguide grating type optical multiplexer/demultiplexer with high production yield.

In the above embodiments, although the arrayed waveguide grating is utilized as a demultiplexer, the arrayed waveguide grating may also be utilized as a multiplexer. In such a case, light is input from the second optical waveguides 16 and output from one of the first optical waveguide 12.

Obviously, numerous modifications and variations of the present invention are possible in light of the above teachings. It is therefore to be understood that, within the scope of the appended claims, the invention may be practiced otherwise than as specifically described here.

What is claimed as new and desired to be secured by Letters Patent of the United States is:

1. An arrayed waveguide grating optical multiplexer/demultiplexer comprising:

at least one first optical waveguide;

a first slab waveguide;

an arrayed waveguide connected to said at least one first optical waveguide via said first slab waveguide, said arrayed waveguide comprising a plurality of channel waveguides each of which has a different length;

a second slab waveguide;

a plurality of second optical waveguides connected to said arrayed waveguide via said second slab waveguide; and at least one expanding width waveguide having a first end portion and a second end portion, a second width of the second end portion being larger than a first width of the first end portion, the first end portion of each of said at least one expanding width waveguide being connected to each of said at least one first optical waveguide, the second end portion being connected to said first slab waveguide, the first width of the first end portion being larger than a first optical waveguide width of said at least one first optical waveguide, the first width of said first end portion satisfying a single mode condition, a width of said at least one expanding width waveguide increasing from the first end portion toward the second end portion.

2. An arrayed waveguide grating optical multiplexer/demultiplexer according to claim 1, further comprising:

at least one straight waveguide each provided between each of said at least one first optical waveguide and each of said at least one expanding width waveguide, said at least one straight waveguide having a width narrower than the first optical waveguide width of said at least one first optical waveguide.

3. An arrayed waveguide grating optical multiplexer/demultiplexer according to claim 1, further comprising:

at least one constant width waveguide provided between each of said at least one first optical waveguide and each of said at least one expanding width waveguide, said at least one constant width waveguide having a substantially constant width which is substantially equal to the first width of the first end portion of said at least one expanding width waveguide.

4. An arrayed waveguide grating optical multiplexer/demultiplexer according to claim 3, further comprising:

at least one straight waveguide provided between each of said at least one first optical waveguide and each of said at least one constant width waveguide, said at least one straight waveguide having a width narrower than the first optical waveguide width of said at least one first optical waveguide.

5. An arrayed waveguide grating optical multiplexer/demultiplexer according to claim 1, wherein the first width (w) of said first end portion satisfies the following expression, $$w < \frac{3\lambda}{\pi\sqrt{n_1^2 - n_0^2}} \quad \text{(Exp. 4)}$$

where ($n_1$) is refractive index of core, ($n_0$) is refractive index of cladding, and ($\lambda$) is a wavelength of light.

6. An arrayed waveguide grating optical multiplexer/demultiplexer according to claim 1, wherein said at least one expanding width waveguide has a trapezoidal shape in which the first end portion is an upper base and the second end portion is a lower base.

7. An arrayed waveguide grating optical multiplexer/demultiplexer according to claim 1, wherein all of said at least one first optical waveguide are connected to all of said plurality of expanding width waveguides, respectively.

8. An arrayed waveguide grating optical multiplexer/demultiplexer according to claim 1, wherein said at least one first optical waveguide comprises a plurality of first optical waveguides at least one of which is connected to said first slab waveguide without interposing said at least one expanding width waveguide.

9. An arrayed waveguide grating optical multiplexer/demultiplexer comprising:
at least one first optical waveguide;
a first slab waveguide;
an arrayed waveguide connected to said at least one first optical waveguide via said first slab waveguide, said arrayed waveguide comprising a plurality of channel waveguides each of which has a different length;
a second slab waveguide;
a plurality of second optical waveguides connected to said arrayed waveguide via said second slab waveguide; and
a plurality of expanding width waveguides each having a third end portion and a fourth end portion, a fourth width of the fourth end portion being larger than a third width of the third end portion, the third end portion of each of said plurality of expanding width waveguides being connected to each of said plurality of second optical waveguides, the fourth end portion being connected to said second slab waveguide, the third width of the third end portion being larger than a second optical waveguide width of each of said plurality of second optical waveguides, the third width of said third end portion satisfying a single mode condition, a width of said expanding width waveguide increasing from the third end portion toward the fourth end portion.

10. An arrayed waveguide grating optical multiplexer/demultiplexer according to claim 9, further comprising:
a plurality of straight waveguides each provided between each of said plurality of second optical waveguides and each of said plurality of expanding width waveguides, each of the said plurality of straight waveguides having a width narrower than the second optical waveguide width of each of said plurality of second optical waveguides.

11. An arrayed waveguide grating optical multiplexer/demultiplexer according to claim 9, further comprising:
a plurality of constant width waveguides each provided between each of said plurality of second optical waveguides and each of said plurality of expanding width waveguides, each of said plurality of constant width waveguides having a substantially constant width which is substantially equal to the third width of the third end portion.

12. An arrayed waveguide grating optical multiplexer/demultiplexer according to claim 11, further comprising:
a plurality of straight waveguides each provided between each of said plurality of second optical waveguides and each of said plurality of constant width waveguides, each of said plurality of straight waveguides having a width narrower than the second optical waveguide width of each of said plurality of second optical waveguides.

13. An arrayed waveguide grating optical multiplexer/demultiplexer according to claim 9, wherein the third width (w) of said third end portion satisfies the following expression, $$w < \frac{3\lambda}{\pi\sqrt{n_1^2 - n_0^2}} \quad \text{(Exp. 4)}$$

where ($n_1$) is refractive index of core, ($n_0$) is refractive index of cladding, and ($\lambda$) is a wavelength of light.

14. An arrayed waveguide grating optical multiplexer/demultiplexer according to claim 9, wherein each of said plurality of expanding width waveguides has a trapezoidal shape in which the third end portion is an upper base and the fourth end portion is a lower base.

15. An arrayed waveguide grating optical multiplexer/demultiplexer comprising:
at least one first optical waveguide;
a first slab waveguide;
an arrayed waveguide connected to said at least one first optical waveguide via said first slab waveguide, said arrayed waveguide comprising a plurality of channel waveguides each of which has a different length;
a second slab waveguide;
a plurality of second optical waveguides connected to said arrayed waveguide via said second slab waveguide;
at least one first expanding width waveguide having a first end portion and a second end portion, a second width of the second end portion being larger than a first width of the first end portion, the first end portion of each of said at least one first expanding width waveguide being connected to each of said at least one first optical waveguide, the second end portion being connected to said first slab waveguide, the first width of the first end portion being larger than a first optical waveguide width of said at least one first optical waveguide, the first width of said first end portion satisfying a single mode condition, a width of said at least one first expanding width waveguide increasing from the first end portion toward the second end portion; and
a plurality of second expanding width waveguides each having a third end portion and a fourth end portion, a fourth width of the fourth end portion being larger than a third width of the third end portion, the third end portion of each of said plurality of second expanding width waveguides being connected to each of said plurality of second optical waveguides, the fourth end portion being connected to said second slab waveguide, the third width of the third end portion being larger than a second optical waveguide width of each of said plurality of second optical waveguides, the third width of said third end portion satisfying a single mode condition, a width of said second expanding width waveguide increasing from the third end portion toward the fourth end portion.

16. An arrayed waveguide grating optical multiplexer/demultiplexer according to claim 15, further comprising:
at least one first straight waveguide each provided between each of said at least one first optical waveguide and each of said at least one first expanding width waveguide, the at least one first straight waveguide having a width narrower than the first optical waveguide width of said at least one first optical waveguide.

17. An arrayed waveguide grating optical multiplexer/demultiplexer according to claim 16, further comprising:

a plurality of second straight waveguides each provided between each of said plurality of second optical waveguides and each of said plurality of second expanding width waveguides, the second straight waveguides each having a width narrower than the second optical waveguide width of each of said plurality of second optical waveguides.

18. An arrayed waveguide grating optical multiplexer/demultiplexer according to claim 15, further comprising:

a plurality of second straight waveguides each provided between each of said plurality of second optical waveguides and each of said plurality of second expanding width waveguides, the second straight waveguides each having a width narrower than the second optical waveguide width of each of said plurality of second optical waveguides.

19. An arrayed waveguide grating optical multiplexer/demultiplexer according to claim 15, further comprising:

at least one first constant width waveguide each provided between each of said at least one first optical waveguide and each of said at least one first expanding width waveguide, the first constant width waveguide having a substantially constant width which is substantially equal to the first width of the first end portion of said at least one first expanding width waveguide.

20. An arrayed waveguide grating optical multiplexer/demultiplexer according to claim 19, further comprising:

at least one first straight waveguide each provided between each of said at least one first optical waveguide and each of said first constant width waveguide, the first straight waveguide having a width narrower than the first optical waveguide width of said at least one first optical waveguide.

21. An arrayed waveguide grating optical multiplexer/demultiplexer according to claim 19, further comprising:

a plurality of second constant width waveguides each provided between each of said plurality of second optical waveguides and each of said plurality of expanding width waveguides, each of the second constant width waveguides having a substantially constant width which is substantially equal to the third width of the third end portion.

22. An arrayed waveguide grating optical multiplexer/demultiplexer according to claim 21, further comprising:

at least one first straight waveguide each provided between each of said at least one first optical waveguide and each of said at least one first constant width waveguide, the at least one first straight waveguide having a width narrower than the first optical waveguide width of said at least one first optical waveguide.

23. An arrayed waveguide grating optical multiplexer/demultiplexer according to claim 22, further comprising:

a plurality of second straight waveguides each provided between each of said plurality of second optical waveguides and each of said plurality of second constant width waveguide, each of the second straight waveguides having a width narrower than the second optical waveguide width of each of said plurality of second optical waveguides.

24. An arrayed waveguide grating optical multiplexer/demultiplexer according to claim 15, further comprising:

a plurality of second constant width waveguides each provided between each of said plurality of second optical waveguides and each of said plurality of second expanding width waveguides, the second constant width waveguides each having a substantially constant width which is substantially equal to the third width of the third end portion.

25. An arrayed waveguide grating optical multiplexer/demultiplexer according to claim 24, further comprising:

a plurality of second straight waveguides each provided between each of said plurality of second optical waveguides and each of said plurality of second constant width waveguides, the second straight waveguides each having a width narrower than the second optical waveguide width of each of said plurality of second optical waveguides.

26. An arrayed waveguide grating optical multiplexer/demultiplexer according to claim 25, further comprising:

at least one first constant width waveguide each provided between said at least one first optical waveguide and said at least one first expanding width waveguide, the at least one first constant width waveguide having a substantially constant width which is substantially equal to the first width of the first end portion of said at least one first expanding width waveguide.

27. An arrayed waveguide grating optical multiplexer/demultiplexer according to claim 15, wherein the first width (w) of said first end portion satisfies the following expression, $$w < \frac{3\lambda}{\pi\sqrt{n_1^2 - n_0^2}} \quad \text{(Exp. 4)}$$

where ($n_1$) is refractive index of core, ($n_0$) is refractive index of cladding, and ($\lambda$) is a wavelength of light.

28. An arrayed waveguide grating optical multiplexer/demultiplexer according to claim 15, wherein the third width (w) of said third end portion satisfies the following expression, $$w < \frac{3\lambda}{\pi\sqrt{n_1^2 - n_0^2}} \quad \text{(Exp. 4)}$$

where ($n_1$) is refractive index of core, ($n_0$) is refractive index of cladding, and ($\lambda$) is a wavelength of light.

29. An arrayed waveguide grating optical multiplexer/demultiplexer according to claim 15, wherein said at least one first expanding width waveguide has a trapezoidal shape in which the first end portion is an upper base and the second end portion is a lower base, and wherein each of said plurality of second expanding width waveguides has a trapezoidal shape in which the third end portion is an upper base and the fourth end portion is a lower base.

* * * * *